US009075787B2

(12) United States Patent
Schödl

(10) Patent No.: US 9,075,787 B2
(45) Date of Patent: Jul. 7, 2015

(54) DEFINING A REUSABLE SPREADSHEET-FUNCTION BY EXTRACTING THE FUNCTION FROM A COMPLEX CALCULATION IN A SPREADSHEET DOCUMENT

(75) Inventor: Arno Schödl, Berlin (DE)

(73) Assignee: THINK-CELL SOFTWARE GMBH, Berlin (DE)

( * ) Notice: Subject to any disclaimer, the term of this patent is extended or adjusted under 35 U.S.C. 154(b) by 1255 days.

(21) Appl. No.: 12/956,553

(22) Filed: Nov. 30, 2010

(65) Prior Publication Data

US 2012/0137203 A1    May 31, 2012

(51) Int. Cl.
*G06F 17/24* (2006.01)

(52) U.S. Cl.
CPC .................... *G06F 17/246* (2013.01)

(58) Field of Classification Search
CPC .................................................. G06F 17/246
USPC ......................................... 715/212, 213, 219
See application file for complete search history.

(56) References Cited

U.S. PATENT DOCUMENTS

| | | | | |
|---|---|---|---|---|
| 6,766,512 | B1* | 7/2004 | Khosrowshahi et al. | 717/140 |
| 2004/0064470 | A1* | 4/2004 | Raue | 707/100 |
| 2004/0103366 | A1* | 5/2004 | Peyton-Jones et al. | 715/503 |
| 2005/0081141 | A1* | 4/2005 | Jonsson | 715/503 |
| 2005/0188352 | A1* | 8/2005 | Jager et al. | 717/106 |
| 2006/0024653 | A1* | 2/2006 | Battagin et al. | 434/350 |
| 2006/0036939 | A1* | 2/2006 | Hobbs et al. | 715/503 |
| 2006/0080595 | A1* | 4/2006 | Chavoustie et al. | 715/503 |
| 2006/0090156 | A1* | 4/2006 | Tanenbaum | 717/140 |
| 2007/0033519 | A1* | 2/2007 | Zdenek | 715/503 |
| 2007/0250764 | A1* | 10/2007 | Jiang | 715/503 |
| 2008/0016041 | A1* | 1/2008 | Frost et al. | 707/3 |
| 2008/0256432 | A1* | 10/2008 | Sambandam et al. | 715/212 |
| 2009/0172063 | A1* | 7/2009 | Chirilov et al. | 708/441 |
| 2009/0235154 | A1* | 9/2009 | Khen et al. | 715/219 |
| 2010/0269092 | A1* | 10/2010 | Dorman | 717/106 |
| 2012/0151378 | A1* | 6/2012 | Parish et al. | 715/751 |

* cited by examiner

*Primary Examiner* — Cesar Paula
*Assistant Examiner* — Yahao Chen
(74) *Attorney, Agent, or Firm* — Fleit Gibbons Gutman Bongini & Bianco PL; Martin Fleit; Paul D. Bianco

(57) ABSTRACT

The invention relates to a computer-implemented method for displaying data values calculated by a spreadsheet-function, the method comprising:
Specifying one or more formal output parameters by specifying, for each formal output parameter, a first cell of a spreadsheet document,
Specifying one or more formal input parameters by specifying, for each formal input parameter, a second cell,
Specifying a spreadsheet-function body,
wherein the specified spreadsheet-function in operation provides a user with the option for:
Calculating a first output parameter value,
Displaying the one or more first output parameter values or a data value having been derived thereof in a $3^{rd}$ cell,
Calculating a second output parameter value, and
Displaying the one or more second output parameter values or a data value having been derived thereof in a $4^{th}$ cell, wherein the $3^{rd}$ cell and the $4^{th}$ cell display their respective data content within the spreadsheet document at the same time.

11 Claims, 16 Drawing Sheets

DEFINING A REUSABLE SPREADSHEET-FUNCTION BY EXTRACTING THE FUNCTION FROM A COMPLEX CALCULATION IN A SPREADSHEET DOCUMENT

FIELD OF THE INVENTION

The present invention relates to the field of data processing, and more particularly to a computer implemented method for displaying data values calculated by a spreadsheet-function.

BACKGROUND AND RELATED ART

Spreadsheet applications are widely used in the business- and education sector. One reason for their ubiquitous use is that they provide end-users not skilled in any programming language with means to specify calculations of various levels of complexity.

A formula specified within a cell can be of arbitrary complexity. In order to specify highly complex calculations in a spreadsheet application, commonly a multitude of formulas contained in a multitude of cells referencing each other are specified by a user.

It is a common requirement to execute complex calculations within a spreadsheet application on multiple different sets of input parameters and to compare the results generated on said different input data sets in order to evaluate the impact of the input data values on the final result. A scientist may have developed a complex formula representing a scientific theory and may want to evaluate the impact of different input data values on the result generated by his model. An accountant may want to know the impact of a reduction of costs in one item of expense on the final result calculated. A family may want to document and monitor the monthly income and expenses of each family member with the help of formulas specified in a spreadsheet document. In any of those cases it is required that the complex calculation, once having been specified, can be reused on different sets of input parameter values.

A related and common requirement is to execute nested, e.g. recursive, functions. A typical example of executing a nested function is the calculation of the surrender value of a life insurance over multiple years, given a particular amount of annual savings and a particular interest rate as input parameters. The calculation may soon get even more complex, if one of the input parameters, e.g. the annual savings and/or the annual interest rate is not constant over time, as it is often the case in practice.

Despite the ubiquity of the usage of spreadsheet applications such as EXCEL for calculating results from different input parameter values, existing spreadsheet applications do not provide means for displaying multiple result values generated by the same spreadsheet-function on different sets of input parameter values at the same time. The means provided by existing spreadsheet applications for displaying and evaluating the impact of a particular input data value on the final result are not intuitive, difficult to maintain and/or not applicable for users not familiar with a programming language (i.e. the broad majority of all users of spreadsheet applications).
Reusing Complex Calculations—State of the Art:

The most widely used spreadsheet application program, Microsoft EXCEL, provides users with the option to specify complex calculations by specifying a multitude of formula cells referencing each other. Basically, EXCEL provides two options for reusing a complex calculation multiple times on different input data sets after said calculation has been specified: the 'code-duplication' option and the 'scenario manager' option.

A complex calculation is usually specified in EXCEL via a multitude of cells referencing each other and comprising formulas and/or data values. If a user chooses the 'code duplication' option to apply such a complex calculation on two or more different sets of input parameter values, he or she has to copy the totality of cells specifying the complex calculation, paste said copied cells into another section of the same worksheet or into another worksheet, and edit the data values used as input by the duplicated cells.

A further means provided by EXCEL for specifying and reusing complex spreadsheet-functions on two or more different input data sets is the 'scenario-manager': a scenario is a set of input parameter values which is used to calculate an output parameter value. The 'scenario manager' manages different sets of input parameter values, each set corresponding to and representing a separate scenario. With the help of the scenario manager, the user can create different sets of input parameter values which are all assigned to one particular spreadsheet-function, e.g. a summarization or a complex user-defined mathematical function. Each scenario comprises a result value having been calculated on the input parameter set of said scenario. By switching between different scenarios, a user can evaluate the impact of different sets of input parameter values on the calculation result. However, as the two or more specified scenarios are displayed by the scenario manager in mutual exclusion, the user is not able to see and compare the two or more results at the same time. In addition, the results generated by the scenario-manager cannot be reused by other spreadsheet-functions.

Some spreadsheet applications, such as EXCEL, provide the user with the possibility to specify functions by means of a programming language such as VBA (Visual Basic for Applications). A person with programming skills may also use a programming language to create functions which can be applied multiple times on different sets of input parameter values. In practice, however, the overwhelming majority of EXCEL users does not have programming skills and is forced to rely solely on the 'copy-paste' option and the 'scenario manager'.

SUMMARY OF THE INVENTION

It is one object of the present invention to provide end-users of spreadsheet applications unskilled in programming languages with an improved method for specifying complex functions by means provided by a spreadsheet application.

This object is solved by the features of the independent claims. Preferred embodiments of the invention are given in the dependent claims.

A spreadsheet application is a software application simulating a paper worksheet. A spreadsheet document comprises one or multiple worksheets. Each worksheet comprises multiple cells which together constitute a matrix of rows and columns. Each cell can contain a data value, a reference, a formula, or any combination thereof. A data value can be, for example, a particular numerical value, a particular date, a currency value or an alphanumeric text. A formula is an expression specifying how the data content displayed by a cell is to be calculated. In a spreadsheet application, typically all formulas specified within a spreadsheet document are calculated each time the document is refreshed. Refreshing can be triggered e.g. by editing a cell of a spreadsheet document.

A cell containing a formula can, according to most spreadsheet applications, be viewed in two different modes: in 'view mode', a cell containing a formula displays the output parameter value calculated by said formula. In 'edit mode', which is typically initiated by a user selecting a cell, the formula contained in said cell is shown and can be edited.

In the following, the term 'cell' refers to a spreadsheet document cell. A cell can be identified within a worksheet of a spreadsheet document e.g. by its column- and row index.

In the following, the term 'reference' refers to a unique identifier of a cell being specified e.g. within another cell, e.g. 'D4'. The syntax of a reference may differ depending on the spreadsheet application. In the following, the EXCEL syntax will be used in all formulas, expressions and references given as examples. The reference '=D4', for example, is in the following considered as a reference to the cell with column index 'D' and row index '4'. The present invention is, however, by no means limited to a particular spreadsheet application or to a particular syntax for referencing cells.

In the following, the term 'formula' refers to an expression contained within a cell, the expression specifying computer-implemented instructions to be applied on one or multiple data values to generate an output parameter value. The generated output parameter value is displayed in the formula cell in view mode. A cell comprising a formula is referred to as 'formula cell'. A formula may comprise one or multiple references. A formula typically has the format '=expression', wherein the '=' operator assigns the expression to the cell containing the formula. An expression can be, for example, a numerical data value such as the number '233', a string value 'ABCDE', a currency value, e.g. '40$', or the like. A formula can comprise a mathematical function such as '=SUM(C3; C9; 50)', conditions, e.g. IF-THEN-ELSE conditional expressions, and the like. A formula may also be a composition of all or some of the above mentioned elements, e.g. a combination of multiple data values or references connected by mathematical operators and/or functions, e.g. '=A3+12', '=24/7', or '=13*(⅚+SUM(498; D4; 30; F35))'.

The term 'function' in the following refers to a computer-implemented procedure taking one or more data values as input and calculating one or more output parameter values. Typically, a function is constituted by its formal input parameters, its formal output parameters and its function body.

The term 'spreadsheet-function' refers to a function specified by means provided by a spreadsheet application such as cells, formulas and/or references, in particular a user-defined spreadsheet-function. The term 'means provided by a spreadsheet application' in this context does not include means provided by a programming language which comprise e.g. the specification of functions by writing several lines of code according to the syntax of said programming language. A spreadsheet-function calculates a result, e.g. an output parameter value, from a set of one or more input parameter values.

A 'formal output parameter' of a function is a placeholder to which a data value calculated as the result of said function is assigned.

A 'formal input parameter' of a function is a placeholder to which a data value used as input parameter value of said function is assigned.

A 'spreadsheet-function body' is the function body of a spreadsheet-function.

Embodiments of the present invention are particularly advantageous as they provide means for easily specifying reusable spreadsheet-functions.

In a further beneficial aspect of embodiments of the invention, reusable spreadsheet-functions can be specified and applied by users not skilled in any programming language. Any user being familiar with the basic concepts of a spreadsheet application such as cells, references, formulas and/or data values is able, based on embodiments of the present invention, to specify reusable spreadsheet-functions. According to said embodiments, a severe limitation of existing spreadsheet-applications is overcome. Said limitation is, that spreadsheet documents do not support one of the most fruitful concepts of programming languages: the concept of specifying reusable functions which are not associated with one particular input or output parameter value. Current spreadsheet applications do not provide users not skilled in a programming language with means to specify complex calculations in the form of reusable functions whose method body is not tightly coupled to a particular set of cells and which are operable to present multiple results calculated based on multiple different data sets at the same time. A spreadsheet-function coupled to a set of cells cannot be separated from said cells and can therefore not be used a second time. A user who wants to apply the same complex calculation multiple times has to duplicate all cells comprising the data values and formulas necessary to calculate the result of a function. Said copy-paste approach results in massive code-duplication, reduced maintainability, a high risk of introducing errors or inconsistencies and of overloading a spreadsheet with highly redundant data.

One important advantage according to embodiments of the invention is that by specifying a spreadsheet-function which is not coupled to a particular set of cells, the formula cell(s) do not have to be multiplied in order to apply said spreadsheet-function multiple times on different data sets. The risk of introducing errors can thereby greatly be reduced. Spreadsheet-functions specified according to embodiments of the invention can be maintained more easily compared to state-of-the-art spreadsheet applications.

In a further advantageous aspect, embodiments of the invention provide users of spreadsheet applications unskilled in programming languages with an improved method for applying a specified spreadsheet-function on multiple different sets of input parameter values and to display the results obtained on each input parameter value set at the same time.

In a further advantageous aspect, embodiments of the invention provide a method for intuitively specifying spreadsheet-functions which can easily be maintained and adapted to changed user requirements.

In a further advantageous aspect, embodiments of the invention provide the user with the option to create nested functions, i.e. functions which, when executed, call one or more other functions. The calling function may use the results generated by the called functions for calculating an output value. A user specifying a spreadsheet-function according to embodiments of the invention does not need programming skills for specifying said nested functions. Rather, concepts such as cells, formulas and references, which are concepts every spreadsheet user is acquainted with, are sufficient for specifying spreadsheet-functions, including nested spreadsheet-functions.

In a further advantageous aspect, embodiments of the invention provide means to specify a reusable function by means of a GUI. Said GUI means comprise e.g. buttons, context menus, dialog windows and the like. Said embodiments allow users lacking programming skills to specify reusable functions in a spreadsheet document.

In a further advantageous aspect, embodiments of the invention provide means to automatically extract a reusable spreadsheet-function from a complex calculation having been specified by a set of connected cells. Said spreadsheet-function is specified by finding references pointing to or from cells belonging to said set of cells specifying the complex calculation.

Embodiments of the invention allow the specification of user-defined functions comprising formal input and output parameters. As a result, end-users lacking programming skills are enabled to specify functions which can be reused multiple times on different input parameter values, which can be used recursively and which can be maintained easily because the function body has to be specified and adapted only once.

In one aspect, the invention relates to a computer-implemented method for displaying data values calculated by a spreadsheet-function. The method comprises the following steps:

Specifying one or more formal output parameters by specifying, for each formal output parameter, a first cell of a spreadsheet document, Specifying one or more formal input parameters by specifying, for each formal input parameter, a second cell of the spreadsheet document, Specifying a spreadsheet-function body, wherein the specified one or more formal output parameters, the specified one or more formal input parameters and the specified spreadsheet-function body specify the spreadsheet-function, wherein the specified spreadsheet-function in operation provides a user with the option for:

Calculating a first output parameter value for each of the one or more formal output parameters by using one or more first input parameter values as input of the spreadsheet-function, Displaying the one or more first output parameter values or a data value having been derived thereof in a $3^{rd}$ cell, Calculating a second output parameter value for each of the one or more formal output parameters by using one or more second input parameter values as input of the spreadsheet-function, and Displaying the one or more second output parameter values s or a data value having been derived thereof in a $4^{th}$ cell, wherein the $3^{rd}$ cell and the $4^{th}$ cell display their respective one or more output parameter values or derivative data values within the spreadsheet document at the same time.

In the following, said steps will be described in greater detail. Expressions such as 'first cell', 'second cell', 'first set of cells' should be considered as proper names throughout this application.

Specifying One or More Formal Output Parameters by Specifying, for Each Formal Output Parameter, a First Cell of a Spreadsheet Document According to embodiments of the invention, an output parameter value is a data value returned by a first cell, the first cell having been used for specifying a formal output parameter of the spreadsheet-function.

A user of a spreadsheet application program may have already created or otherwise retrieved a spreadsheet document which comprises a complex spreadsheet-function in the form of a multitude of cells, each of said cells comprising one or more data values and/or references and/or formulas. A formal output parameter is specified by specifying a first cell of a spreadsheet document. Depending on the embodiment of the invention, a multitude of different ways for specifying said first cell can be applied.

According to some embodiments of the invention, graphical user interface elements are used to select one or more particular cells within a spreadsheet document, each selected cell specifying a formal output parameter. Said GUI elements comprise dialog windows, cell selectors, context menus and the like.

According to other embodiments of the invention, the user may select a set of cells within a spreadsheet document comprising the cells specifying the complex calculation.

Each of the one or more cells specifying a formal output parameter of the spreadsheet-function will in the following be referred to as 'first cell'.

Specifying One or More Formal Input Parameters by Specifying, for Each Formal Input Parameter, a Second Cell of the Spreadsheet Document One or more formal input parameters are specified by specifying, for each formal input parameter, one second cell of a spreadsheet document. Depending on the embodiment of the invention, a multitude of different ways for specifying said one or more second cells can be applied. According to some embodiments of the invention, graphical user interface elements are used to select one or more cells within a spreadsheet document to represent the one or more formal input parameters, e.g. dialog windows comprising a cell selector, context menus, and the like.

According to further embodiments of the invention, one or more formal input parameters are determined automatically by following references starting from a particular first cell or by starting from an array of first cells.

Each of the one or more cells specifying a formal input parameter will in the following be referred to as 'second cell'.

Specifying a Spreadsheet-Function Body, Wherein the Specified One or More Formal Output Parameters, the One or More Formal Input Parameters and the Spreadsheet-Function Body Specify the Spreadsheet-Function Depending on the embodiment of the invention, a multitude of different ways for specifying the spreadsheet-function body can be applied. According to some embodiments, the spreadsheet-function body is specified by a first set of cells, whereby each cell of said first set of cells is referenced by a first cell representing a formal output parameter via one direct reference and/or via at least one chain of references. Each second cell is referenced by one or more cells of the first set of cells, wherein the one or more first cells and the one or more second cells do not belong to the first set of cells.

The phrase 'chain of references' refers to a set of two or more references which connect three or more cells to each other, wherein a reference is a directed pointer from one cell to another. Each second cell being connected to a first cell by a chain of references can be reached starting from the first cell by following all references of said chain. The phrase 'chain of references' does not imply that the three or more cells connected to each other by the chain of references are solely connected via a linear sequence of references. Said connected cells may be connected via one or more additional chains of references, thereby forming an acyclic graph of references.

The specified formal output parameter, the one or more formal input parameters, and the spreadsheet-function body specify, i.e. constitute, the spreadsheet-function.

In Operation, e.g. when the Specified Spreadsheet-Function is Executed, the Following Steps can be Executed:

calculating a first output parameter value for each of the one or more formal output parameters by using a first input parameter value for each of the one or more formal input parameters of the spreadsheet-function, displaying the one or more first output parameter values or a data value having been derived thereof in a $3^{rd}$ cell, calculating a second output parameter value for each of the one or more formal output parameters by using one or more second input parameter values as input of the spreadsheet-function, and displaying one or more second output parameter values or a data value having been derived thereof in a $4^{th}$ cell, wherein the $3^{rd}$ cell and the $4^{th}$ cell display their respective one or more output parameter values or data values having been derived thereof within one spreadsheet document at the same time.

The term 'derived' as used herein encompasses any kind of data value having been calculated based on one or more initial data values. For example, by executing a summarization, multiplication or other function on a first data value, a second, derivative data value can be obtained.

Contrary to the 'scenario manager', which allows the execution of a specified spreadsheet-function on different input data sets only in mutual exclusion, the present invention provides the user with the option to calculate a first result, i.e. one or more first output parameter values, by using a first set of input parameter values as input for the specified spreadsheet-function. In addition, the user can calculate a second result, i.e. one or more second output parameter values or a data value derived thereof, by using a second set of input parameter values as input for the specified spreadsheet-function. Both results can be displayed to the user at the same time, e.g. within the same worksheet or within the same spreadsheet document. As a result, the impact of each input parameter value is displayed to the user in an intuitive way: the user can see the result data values generated on each of the two input parameter values at the same time. The user may also specify three or more different sets of input parameter values and display the three corresponding or more different results at the same time.

According to preferred embodiments of the invention, the specification of a spreadsheet-function further comprises the step of creating a spreadsheet-function formula representing the specified spreadsheet-function.

A 'spreadsheet-function formula' of a spreadsheet-function is a representation of said spreadsheet-function within one single cell. The evaluation of said spreadsheet-function formula makes use of all data values, operators and formulas contained in all the cells specifying the one or more formal output parameters, the one or more formal input parameters and the function body of a spreadsheet-function. Depending on the embodiment of the invention, different syntactic representations of a spreadsheet-function formula exist. According to some embodiments, a spreadsheet-function formula may be represented and be referred to by a keyword such as 'SUBCALC'.

According to embodiments of the invention, a spreadsheet-function is executed by using a keyword otherwise not used in spreadsheet formulas, e.g. 'SUBCALC'. According to embodiments, said keyword is assigned to the spreadsheet-function automatically during the specification of the spreadsheet-function. The keyword may be used to hide complexity.

According to embodiments, said keyword acts as function name of the specified spreadsheet-function and can be used to call said specified spreadsheet-function and re-execute it on different sets of input parameters, e.g. by copying the keyword to other cells or by entering said keyword in another cell and by assigning to said copied or newly entered keyword one or more references pointing to cells comprising a new set of input parameter values. Said assignment may be executed in 'edit mode' by the user. The calculated one or more output parameter values are then displayed in that cell comprising the copied or newly entered keyword.

According to further embodiments of the invention, a user can specify a name for each specified spreadsheet-function.

Depending on the embodiment, the assignment is performed by means of a GUI or by means of a special command. The special command is specified by a user, e.g. in a cell, and assigns a user-specified name to the spreadsheet-function. For example, a user may assign said spreadsheet-function a user-defined name 'FOO' by using a special command DECLARE SUBCALC.

According to embodiments of the invention, the simultaneous display of a first and a second output parameter value is achieved by using a first and a second spreadsheet-function formula. After or during the specification of the spreadsheet-function, a spreadsheet-function formula representing the specified function is created automatically.

A first set of input parameter values is displayed in one or more $5^{th}$ cells and a second set of input parameters is displayed in one or more $6^{th}$ cells.

Each formal input parameter of the first spreadsheet-function formula is assigned a reference to a $5^{th}$ cell. One or more first output parameters are calculated by the first spreadsheet-function formula as a result, the first one or more output parameters or a data value having been derived thereof are displayed in the $3^{rd}$ cell. In addition, each formal input parameter of the second spreadsheet-function formula is assigned a reference to an $6^{th}$ cell. One or more second output parameters are calculated by the second spreadsheet-function formula as a result, the one or more second output parameters or a data value having been derived thereof are displayed in the $4^{th}$ cell.

One First Cell Per Specified Spreadsheet-Function

According to embodiments of the invention, a spreadsheet-function is specified by executing the following steps:

selecting a second set of cells, finding at least one cell within the second set of cells which is referenced by at least one $7^{th}$ cell, said $7^{th}$ cell not belonging to the second set of cells, for one of said at least one found cells, specifying the spreadsheet-function, wherein the specification of the spreadsheet-function comprises the steps:

Using said one of said at least one found cells as the first cell, thereby specifying a formal output parameter of the spreadsheet-function, Finding a first set of cells, the first set of cells being a sub-set of the second set of cells, the first set of cells specifying the function-body, wherein the first set of cells is found by determining all cells belonging to the second set of cells which:

are referenced by the first cell via one reference and/or via at least one chain of references, and which do not comprise a reference to a cell not belonging to the second set of cells, Finding the one or more second cells by determining all cells within the second set of cells which each:

are referenced by the first cell via one reference and/or via at least one chain of references, and which each comprise a reference to a cell not belonging to the second set of cells, said one or more referenced cells not belonging to the second set of cells being used as one or more $8^{th}$ cells, Using each of the one or more found second cells to specify one formal input parameter of the spreadsheet-function, Using the formulas and/or data values and/or references contained in the cells belonging to the first set of cells to specify the function-body of the spreadsheet-function.

Multiple First Cells Per Specified Spreadsheet-Function

As has been described previously, according to embodiments of the invention one single first cell is used for specifying one corresponding spreadsheet-function. According to some other embodiments, however, a $7^{th}$ cell may comprise an array formula referencing an array of first cells. According to said embodiments, multiple first cells are used to specify one single spreadsheet-function.

According to embodiments of the invention, the selected second set of cells comprises an array of cells whereby the totality of cells belonging to said array of cells is referenced by an array formula, the array formula being contained in a cell not belonging to the selected set of cells. According to said embodiments, specifying the spreadsheet-function comprises the following steps:

selecting a second set of cells,
finding an array of cells within the second set of cells, said array of cells being referenced by a $7^{th}$ cell, the $7^{th}$ cell comprising an array formula, the $7^{th}$ cell not belonging to the second set of cells,
for said array of cells, specifying the spreadsheet-function, wherein the specification of the spreadsheet-function comprises the steps:
Using each cell of said array of cells as first cell, thereby specifying for each cell of the array of cells a formal output parameter of the spreadsheet-function,
Finding a first set of cells, the first set of cells being a sub-set of the second set of cells, the first set of cells specifying the function-body, wherein the first set of cells is found by determining all cells belonging to the second set of cells which:
are referenced by a first cell via one reference and/or via at least one chain of references, and
which do not comprise a reference to a cell not belonging to the second set of cells,
Finding the one or more second cells by determining all cells within the second set of cells which each:
are referenced by a first cell via one reference and/or via at least one chain of references, and
which each comprise a reference to a cell not belonging to the second set of cells, said one or more referenced cells not belonging to the second set of cells being used as one or more $8^{th}$ cells,
Using each of the one or more found second cells to specify one formal input parameter of the spreadsheet-function,
Using the formulas and/or data values and/or references contained in the cells belonging to the first set of cells to specify the function-body of the spreadsheet-function.

Selecting a Second Set of Cells

According to embodiments of the invention, a user selects a second set of cells of the spreadsheet document e.g. by selecting an area of the spreadsheet-function comprising cells specifying a complex calculation a user wants to reuse. The selection of cells can be performed e.g. via a computer mouse. A user may select via the computer mouse e.g. a block of adjacent cells and/or are set of singular cells constituting the second set of cells.

The cells selected by the user as 'second set of cells' comprise formulas and/or data values, which are used, according to embodiments of the invention, to specify a spreadsheet-function. According to preferred embodiments of the invention, the selection of the second set of cells is executed by the user, by means of a computer mouse, by means of GUI elements of various kinds and the like.

Finding at Least One Cell within the Second Set of Cells which is Referenced by at Least One Cell not Belonging to the Second Set of Cells According to preferred embodiments of the invention, the step of finding one or more cells belonging to the second set of cells which are referenced by at least one cell not belonging to the second set of cells is executed automatically.

For One of Said at Least One Cells, a Spreadsheet-Function is Specified.

Each cell found in the previous step and being referenced by at least one cell not belonging to the second set of cells can be used, according to embodiments of the invention, to specify a corresponding spreadsheet-function.

It may be the case that more than one cell belonging to the second set of cells have been found in the previous step to be referenced by a cell not belonging to the second set of cells, said more than one found cells being referred to as 'potential first cell(s)'. Depending on the embodiment of the invention, for each of said potential first cells a spreadsheet-function may be specified automatically.

According to other embodiments of the invention, a user is prompted to specify one or more potential first cells for which a corresponding spreadsheet-function is to be specified afterwards automatically.

In case only one single cell exists within the second set of cells being referenced by a cell not belonging to said second set of cells, said single cell can be automatically used as first cell.

According to embodiments of the invention wherein an array of first cells is referenced by a $7^{th}$ cell, for said array of first cells the spreadsheet-function is specified. In the following, the description will focus on embodiments of the invention wherein one single first cell corresponding to one single formal output parameter is specified. If not explicitly stated otherwise, the assertions made for said embodiments likewise apply to embodiments wherein an array of first cells, each first cell corresponding to a formal output parameter, is used for specifying the spreadsheet-function.

Using One of Said at Least One Found Cells as the First Cell, Thereby Specifying the Formal Output Parameter of the Spreadsheet-Function To simplify matters, in the following the specification of one spreadsheet-function for exactly one potential first cell will be described, said potential first cell being referred to as 'first cell'.

A cell being 'used as first cell' is a cell that represents a formal output parameter of the spreadsheet-function to be specified. Said first cell fulfills the function of a placeholder, the placeholder being assigned a result data value generated by the specified spreadsheet-function in case the spreadsheet-function is executed.

The cell referencing the first cell and not belonging to the second set of cells is in the following called '$7^{th}$ cell'. The $7^{th}$ cell is, according to embodiments of the invention, detected automatically based on said reference. The $7^{th}$ cell may comprise only a reference to the first cell, and will in this case display the same data value as is displayed in the first cell. It is also possible that the $7^{th}$ cell comprises an additional reference to another cell and/or an additional data value. In this case, the data value displayed in the $7^{th}$ cell may deviate from the data value displayed in the first cell.

In case the $7^{th}$ cell comprises an array formula referencing an array of first cells, the $7^{th}$ cell displays a data value having been derived from the formal output parameter values returned by each of the first cells referenced in said array formula.

Finding a First Set of Cells, the First Set of Cells being a Sub-Set of the Second Set of Cells, the First Set of Cells Specifying the Function-Body After having specified the formal output parameter of the spreadsheet-function to be specified, the function-body of the spreadsheet-function to be specified is determined by determining a first set of cells. All cells have to meet the following criteria to be considered as members of the first set of cells and to be used for specifying the function-body:

the cell has to belong to the second set of cells,
the cell must be referenced by a first cell via one reference and/or via at least one chain of references, and
the cell does not comprise a reference to another cell, the other cell not belonging to the second set of cells.

The data values and/or formulas contained in the cells belonging to the first set of cells are used according to preferred embodiments of the invention to specify the function-body of the spreadsheet-function to be specified.

Finding One or More Second Cells, Each Second Cell Specifying a Formal Input Parameter.

Each of the found second cells is used to specify one formal input parameter of the spreadsheet-function to be specified. To be considered as 'second cell' representing a formal input parameter, a cell has to meet the following requirements:

the cell belongs to the second set of cells,
the cell is referenced by a first cell via one reference and/or via at least one chain of references, and
the cell comprises a reference to a cell not belonging to the second set of cells, said referenced cell not belonging to the second set of cells being used as $8^{th}$ cell.

Each of the 'second cells' will display the same data value as contained in or calculated by a formula of the $8^{th}$ cell, the $8^{th}$ cell being referenced by the second cell. Each of the one or more found second cells is used to specify one formal input parameter of the spreadsheet-function. Formulas and/or data values and/or references contained in the cells belonging to the first set of cells are used to specify the function-body of the spreadsheet-function.

According to further embodiments of the invention, finding the first set of cells and finding one or more second cells is executed automatically for the first cell after the user has selected the second set of cells and has interacted with a GUI element, e.g. has pressed a button 'Specify Function'.

A function specified in a programming language may comprise data values such as local constants and/or variables. According to embodiments of the present invention, features such as constants and/or variables may be derived e.g. from data values specified within one or more cells of the first set of cells. All cells belonging to the first set of cells are referenced directly and/or via at least one chain of references by the first cell. One or more cells belonging to the first set of cells may be formula cells. The program instructions specified by the formulas in said one or more formula cells can be used to specify instructions of the function body which process the one or more input parameter values in order to generate an output parameter value.

Displaying a Derivative Data Value

According to embodiments of the invention, the specified spreadsheet-function comprises only one single formal output parameter having been specified by one single first cell. According to said embodiment, the output parameter value returned when applying the specified spreadsheet-function on a first set of input parameter values is identical to the data value returned by the first cell. A $3^{rd}$ or a $4^{th}$ cell can, for example, display the output parameter value as it was returned by the spreadsheet-function. According to other embodiments, the $3^{rd}$ or the $4^{th}$ cell comprise a formula which receives the output parameter of the spreadsheet-function formula and calculates a derivative data value, e.g. a sum, a product or the like.

According to further embodiments, the specified spreadsheet-function comprises multiple first cells. Each first cell belongs to an array of cells, said array of cells being referenced by an array formula of a $7^{th}$ cell. In this case, one output parameter value is returned by the specified spreadsheet-function for each of its first cells. According to said embodiments, the $3^{rd}$ or the $4^{th}$ cell comprise an array formula which calculates a derivative data value from all the returned output parameters, e.g. a sum, a product or the like.

Special Case: Processing Second Cells Comprising a Reference to an $8^{th}$ Cell in Addition to Another Item According to preferred embodiments of the invention, each second cell has to meet an additional criterion in order to specify a formal input parameter: each second cell must comprise exactly one reference to exactly one $8^{th}$ cell. A second cell must not contain one or more other items. The other item can be, for example, a reference to another cell, an additional reference to said $8^{th}$ cell, an operator, a data value or any combination thereof. In case a cell meets all the requirements and criteria to be considered a 'second cell' but comprises a reference to said $8^{th}$ cell in addition to another item, additional steps are executed in order to guarantee that each second cell used for specifying a formal input parameter of the spreadsheet-function meets also the criteria of comprising only one reference to a $8^{th}$ cell. These steps are necessary, because the purpose of each second cell according to preferred embodiments of the invention is to specify exactly one formal input parameter of the spreadsheet-function to be specified. A formal input parameter is a placeholder for one single data value or a data value being of an array type (e.g. a vector, array, etc). In case a second cell comprises a formula such as '=3*D4", the instructions for processing an input data value (*3) have to be separated from the reference (D4) to said input data value.

According to embodiments of the invention, the following steps guarantee that each second cell specifying a formal input parameter contains exactly one reference to one $8^{th}$ cell:

Before the specification of the spreadsheet-function is completed, it is determined for each of the one or more second cells referencing a $8^{th}$ cell whether said second cell contains only one single reference to the $8^{th}$ cell or whether the second cell in addition contains another item. The other item can be, for example, a data value, and/or an operator and/or one or more additional references. The one or more additional references may refer to the same $8^{th}$ cell or to different cells.

In case said determined second cell contains a combination of a reference to a $8^{th}$ cell and another item, at least a $9^{th}$ cell is added to the second set of cells, the $9^{th}$ cell comprising only one single reference to said $8^{th}$ cell.

According to some embodiments of the invention, the $9^{th}$ cell is added by adding an additional row and/or column into a worksheet of a spreadsheet-document. For example, the additional row or column can be inserted right above or besides said determined second cell. In order to maintain the functionality and correctness of the formulas contained already in the spreadsheet, all references of existing cells have to be adapted to the new row- and column indices resulting from the insertion of an additional row or column.

According to further embodiments of the invention, an existing cell not comprising any data, formula or reference which is also not referenced by another cell (in the following called 'empty cell') is used as $9^{th}$ cell. Preferentially, an empty cell lying within the selected second set of cells is used as $9^{th}$ cell.

In said determined second cell containing a combination of a reference to a $8^{th}$ cell and another item, each reference to said $8^{th}$ cell is replaced by a reference to the $9^{th}$ cell. All other items are left unchanged.

In the next step, said $9^{th}$ cell is used as second cell instead of said cell having been determined to contain a combination of a reference to a $8^{th}$ cell and another item. Said $9^{th}$ cell is used as second cell and specifies a formal input parameter of the spreadsheet-function to be specified.

According to further embodiments of the invention, the specified one or more formal output parameters, the one or more formal input parameters and the specified method body are transformed into a formal method of a programming language. The term 'formal method' refers to a method specified by means of a programming language such as VBA, Java, C# or the like which has an identifier, e.g. a name, one or more formal input parameters and one formal output parameter. The formal output parameter is assigned the calculation result generated during the execution of said formal method given a set of input parameters. The 'formal method' can be applied repeatedly on the same or different sets of input parameters by calling the name of the formal method. Depending on the embodiment of the invention, the transformation of the one or more formal input parameters, the one or more formal output parameter and the method body can be executed during the specification of the spreadsheet-function or after the specification of the spreadsheet-function has been completed. According to some embodiments of the invention, the specified spreadsheet-function is transformed into VBA code. Said embodiments provide users having basic skills in programming languages with the option to specify a formal method by means known to every user of a spreadsheet application such as cells, references, formulas and actions such as selecting cells and sets of cells. For example, a user being familiar with the programming language Java but unfamiliar to the programming language of the spreadsheet application, e.g. VBA, may use said embodiment to create a formal method according to VBA syntax. This is particularly advantageous because the modification of existing VBA code is easier for the user than writing new code.

According to further embodiments of the invention, a graphical user interface element (GUI element) is displayed to the user. By interacting with said GUI element, a user can trigger the specification of the spreadsheet-function. Said GUI-element can be, for example, a button, a checkbox item, an entry in a context menu, a main menu item or the like. Said GUI-element can be introduced by means of a plug-in or add-in or can be integral part of the spreadsheet application. An interaction of the user with the GUI element can be, for example, clicking on said GUI element via a mouse button.

For example, a user could have selected a second set of cells comprising at least one cell being referenced by a $7^{th}$ cell and comprising one or more second cells. Each of said second cells references a $8^{th}$ cell, the $8^{th}$ cell and the $7^{th}$ cell not belonging to the second set of cells. Each of the one or more second cells is referenced by a first cell directly and/or via one or more chains of references. After having selected the second set of cells, the user may click on a button 'specify spreadsheet-function'. The event of clicking said button triggers the execution of computer implemented instructions which determine, for a cell being referenced by a cell not belonging to the second set of cells, the spreadsheet-function by: starting from said referenced cell, in the following referred to as 'first cell'; following all references of the first cell or any cell referenced by said first cell until one or more cells are reached which are referenced by said first cell and do not belong to the second set of cells; said cells referencing a cell not belonging to the second set of cells are considered as 'second cells'; each second cell specifies a formal input parameter.

According to other embodiments, an array of first cells is referenced by a cell not belonging to the second set of cells and comprising an array formula. The second and $7^{th}$ cells are according to some of said embodiments determined automatically by following the references and chains of references starting from each of said cells belonging to an array of first cells.

In case more than one cell belonging to the second set of cells is referenced by a cell not belonging to the second set of cells ('potential first cell') and not being referenced by an array formula of a cell not belonging to the second set of cells, for each of said potential first cells a spreadsheet-function may be detected. According to preferred embodiments, the detection and spreadsheet-function specification is executed automatically.

The first cell references each of the at least one second cells directly and/or via one or more chains of references. The cells constituting the at least one chain of references may comprise formulas and data values which constitute the function-body of the spreadsheet-function which is specified automatically after the user has clicked or otherwise interacted with said GUI-element.

Specifying a Spreadsheet-Function by Means of a Dialog Window

According to further embodiments of the invention, the one or more formal input parameters and the one or more formal output parameters are specified by the user via a dialog window of a graphical user interface. The display of the dialog window may be triggered by the user interacting with a GUI element such as a button or a menu item. The dialog window provides the user with means to specify a cell or an array of cells to be used as first cell or as an array of first cells, thereby specifying the formal output parameter or a set of formal output parameters. Said dialog window further provides means to specify one or more cells to be used as one or more second cells, thereby specifying one or more formal input parameters. The means for specifying a cell can be, for example, a 'selector-element' which provides the user with a GUI element for selecting one or more cells within a spreadsheet document.

According to some embodiments of the invention, the function-body is determined automatically after the specification of the first cell and the one or more second cells. The function body comprises all data values and formulas which are contained in all cells being referenced by the first cell directly or via one or more reference chains and which are not specified by the user as second cells.

According to further embodiments of the invention, said dialog window may in addition comprise means for specifying the function-body of the spreadsheet-function to be specified. Said means for specifying the function-body can be implemented as 'selector elements' providing the user with means to select a set of cells, here referred to as 'first set of cells'.

According to further embodiments of the invention, the method of specifying a spreadsheet-function by means of said dialog window may further comprise the steps of checking, whether each of the one or more second cells selected by the user via the GUI element is referenced by the first cell directly or via at least one chain of references. In case it is determined that this condition is not fulfilled, an error message may be displayed to the user and the specification of a spreadsheet-function is prohibited until said condition is fulfilled.

According to further embodiments of the invention, the first cell comprises an array, B1:C2, which may be referenced by an array formula in the 7$^{th}$ cell, e.g., =SUM(D1:E2*FOO (1,2)). An array is a single row or column of cells (a one-dimensional array) or a set of n rows and m columns of cells (a 2-dimensional array). An array formula is a formula whose input values are derived from an array of cells rather from a single cell.

Various embodiments corresponding to different implementation variants exist. In the following, some basic implementation variant types A1, A2 and B will be described.

A) Graph Based Implementations

According to some embodiments of the invention, the specified spreadsheet-function is represented as one or more sub-graphs of a calculation graph of the spreadsheet-function.

Calculations to be executed by a spreadsheet document are, according to embodiments of the invention, implemented as calculation graph, in the following called 'graph'. Each cell in said spreadsheet document comprising a data value, a reference and/or a formula is, according to embodiments of the invention, represented as a node within said graph. A calculation graph of a spreadsheet document is a connected graph, wherein the totality of its nodes represents all data values and formulas specified within a spreadsheet document. Upon each refresh of a spreadsheet document, the computer-interpretable instructions specified in said nodes are executed, resulting in a calculation of the results of all formulas specified within a spreadsheet-function. A cell referencing another cell is represented as a node being connected to another node via a directed edge, whereby the succeeding node takes a data value provided by the preceding node as input for the calculations to be executed by the computer interpretable instructions comprised in the succeeding node.

A node is a data object comprising data being particular to said node. In particular, a node can be an instance of a class defined in an object-oriented programming language such as C++. A node can comprise variables, constants and/or computer-interpretable instructions specifying how one or more data values received from a preceding node are to be processed by the instructions of said node.

In case multiple sets of connected formula cells exists, said graph may comprise multiple isolated trees. A set of connected formula cells is a set of cells referencing each other. Said connected formula cells are operable to calculate a result data value given one or more input data values.

According to embodiments of the invention, the computer implemented method further comprises the step of representing the specified spreadsheet-function as a sub-graph of an executable, connected calculation graph of the spreadsheet document.

According to some embodiments of the invention, one sub-graph is specified for each specified spreadsheet-function. According to other embodiments, one sub-graph is specified upon each execution of the specified spreadsheet-function.

A.1) One Sub-Graph Per Specified Spreadsheet-Function

According to some embodiments of the invention, the specified spreadsheet-function is represented as one single sub-graph of the spreadsheet calculation graph.

According to embodiments of the invention, said sub-graph comprises a set of connected nodes, the set of connected nodes comprising one or more first nodes, one or more second nodes and one or more third nodes.

According to embodiments of the invention, each of the one or more third nodes comprises computer implemented instructions for processing an input data value received from a preceding second node or third node for generating an output data value and for returning said output data value to a succeeding third node or first node. The totality of said computer-implemented instructions contained in all the third nodes represents the function-body of the spreadsheet-function represented by said sub-graph.

Each second node of the sub-graph corresponds to a formal input parameter of the spreadsheet-function. When the specified spreadsheet-function is executed, each second node receives an input parameter value.

Each first node of the sub-graph corresponds to a formal output parameter of the spreadsheet-function. When the specified spreadsheet-function is executed, each first node returns an output parameter value, the output parameter value being calculated by executing computer-implemented instructions of the one or more third nodes by using the input parameter values received by each of the one or more second nodes.

According to said embodiments, the input data values used and the intermediate and final result(s) used and/or generated during the execution of said spreadsheet-function on each particular set of input parameter values are stored in association with the nodes said data values were derived from. Each node may be associated with multiple storage areas to store input, intermediate and result data values for different sets of input parameter values.

According to embodiments of the invention, the input data values used and the intermediate and final result(s) used and/or generated during the execution of said spreadsheet-function are stored in a separate storage area for each particular set of input parameter values.

A 'storage area' is a data storage comprising data and/or computer-interpretable instructions for processing said data. A storage area is a logical data storage unit and can be based on a single or a multitude of different physical data storage components. The computer-interpretable instructions contained in a particular data storage area have access to and can be executed on the data values contained in the same storage area. Whether said computer-interpretable instructions have access to and can process data contained in another storage areas depends on the embodiment of the data structure used for organizing said storage areas.

According to embodiments of the invention, each storage area is part of a particular data structure. Said data structure can be, for example, a linked list, a map, e.g. a hash-map, a LIFO stack, a queue (also referred to as 'FIFO stack'), and the like.

Storing data values in association with a node of the sub-graph said data value was derived from can be implemented, for example, by using pointers, keys of a relational database table, hash maps implemented in a programming language or the like. The input values, intermediate results and the final calculation results are, according to the 'one sub-graph per specified spreadsheet-function' embodiments, not stored as part of their corresponding nodes but instead in separate storage areas, because said data values would be overwritten upon executing the sub-graph based spreadsheet-function a second time. The expression 'stored in association with' a node implies that the data values used as input by each node as well as the data value generated by each node are stored in a way that they can be used by the respective instance of the spreadsheet-function. The data values generated upon executing the spreadsheet-function on a first set of input parameter values are not overwritten when the sub-graph and corresponding spreadsheet-function is applied on a second set of input parameters.

According to embodiments of the invention, displaying one or more first and second output parameter values or data values having been derived thereof in a $3^{rd}$ and a $4^{th}$ cell at the same time comprises the steps of:

Calculating the one or more first output parameter values by using, for each of the one or more second nodes of the sub-graph, a first input parameter value as input, each first input parameter value being displayed in a $5^{th}$ cell, whereby each first input parameter value, the first output parameter value and each intermediate value calculated by a third node of said sub-graph are stored in a first storage area, Displaying the one or more first output parameter values or a data value having been derived thereof in the $3^{rd}$ cell, Calculating the one or more second output parameter values by using, for each of the one or more second nodes, a second input parameter value as input, each second input parameter value being displayed in an $6^{th}$ cell, whereby each second input parameter value, the second output parameter value and each intermediate value calculated by a third node of said sub-graph are stored in a second storage area, and Displaying the one or more second output parameter values or a data value having been derived thereof in the $4^{th}$ cell.

According to embodiments of the invention, the specified spreadsheet-function is executed on a set of nth input parameter values, said embodiments comprising the steps of:

Calculating one or more nth output parameter values by using, for each of the one or more second nodes of the sub-graph, an nth input parameter value as input, said $n^{th}$ input parameter value being displayed in an $(2n+12)^{th}$ cell, whereby each $n^{th}$ input parameter value, the nth output parameter value and each intermediate value calculated by a third node of said sub-graph are stored in an $n^{th}$ storage area, Displaying the one or more $n^{th}$ output parameter values or a data value having been derived thereof in an $(2n+11)^{th}$ cell.

A.2): One Sub-Graph Per Execution of the Specified Spreadsheet-Function on an Input Parameter Set According to embodiments of the invention, a new instance of the specified spreadsheet-function is created upon each execution of the specified spreadsheet-function on a set of input parameter values. Upon each creation of a new instance of the specified spreadsheet-function, a new sub-graph is created and added to the calculation graph of the spreadsheet document.

According to embodiments, each instance of the specified spreadsheet-function having been created upon executing the specified spreadsheet-function is represented as sub-graph, the sub-graph comprising:

one or more second nodes, each second node representing a formal input parameter of the specified spreadsheet-function, each second node receiving an input parameter value when the spreadsheet-function is executed, one or more first nodes, each first node representing a formal output parameter of the specified spreadsheet-function, each first node returning an output parameter value when the spreadsheet-function is executed, and one or more third nodes representing the function body of the specified spreadsheet-function.

According to some embodiments of the invention, a new copy of the sub-graph is created each time a new copy of the spreadsheet-function formula representing the specified spreadsheet-function is created and executed on a particular set of input parameter values.

According to said embodiments, displaying one or more first and second output parameter values or data values having been derived thereof comprises the following steps:

Creating a first sub-graph, said first sub-graph representing a first instance of the specified spreadsheet-function, Calculating one or more first output parameter values by using, for each of the one or more second nodes of the first sub-graph, a first input parameter value as input, said first input parameter value being displayed in a $5^{th}$ cell, whereby each first input parameter value is stored within the second node having received said first input parameter value, the one or more second nodes belonging to the first sub-graph, whereby each first output parameter value is stored within the first node having returned said first output parameter, the one or more first nodes belonging to the first sub-graph, whereby each intermediate data value is stored within one of the third nodes of the first sub-graph, and whereby said first sub-graph is stored in a first storage area, Displaying the one or more first output parameter values or a data value having been derived thereof in the $3^{rd}$ cell, Creating a second sub-graph representing a second instance of the spreadsheet-function, Calculating one or more second output parameter values by using, for each of the one or more second nodes of the second sub-graph, a second input parameter value as input, said second input parameter value being displayed in an $6^{th}$ cell, whereby each second input parameter value is stored within the second node having received said second input parameter value, the one or more second nodes belonging to the second subgraph, whereby each second output parameter value is stored within the first node having returned said second output parameter, the first node belonging to the second sub-graph, whereby each intermediate data value is stored within one of the third nodes of the second sub-graph, and whereby said second sub-graph is stored in a second storage area Displaying the one or more second output parameter values or a data value having been derived thereof in the $4^{th}$ cell.

According to embodiments of the invention, the data values, e.g. the one or more input parameter values, the intermediate results and the final result generated by the first node of the sub-graph, are stored 'within' the nodes the data value is generated or, in case of the one or more second nodes, 'within' that very node a data value is assigned to. To be stored 'within' a node implies that the existence of a data value stored 'within' a data object, e.g. a node data object, is coupled to the existence of said data object instance.

According to embodiments of the invention, executing the specified spreadsheet-function on an nth set of input parameter values comprises the following steps:

Creating an $n^{th}$ sub-graph representing an nth instance of the spreadsheet-function, Calculating one or more nth output parameter values by using, for each of the one or more second nodes of the nth sub-graph, an nth input parameter value as input, said $n^{th}$ input parameter value being displayed in an $(2n+12)^{th}$ cell, whereby each nth input parameter value is stored within the second node having received said nth input parameter value, the one or more second nodes belonging to the nth sub-graph, whereby the one or more nth output parameters are stored within the first node having returned said nth output parameter, the first node belonging to the nth sub-graph, whereby each intermediate data value is stored within one of the third nodes of the nth sub-graph, and whereby said nth sub-graph is stored in an nth storage area, Displaying the one or more nth output parameter values or a data value having been derived thereof in the $(2n+11)^{th}$ cell B: Non-Graph-Based Implementation Variants of the Specified Spreadsheet-Function According to embodiments of the invention, the simultaneous display of multiple results is achieved by storing the data content comprised in each cell constituting the spreadsheet-function in a separate storage area. As a consequence, intermediate and final results generated during each execution of the specified spreadsheet-function on a particular set of input parameter values and the corresponding input parameter values are not overwritten by the second execution of the spreadsheet-function on another set of input parameter values.

Embodiments of the present invention allow displaying one or more first output parameter values or a data value having been derived thereof in the $3^{rd}$ cell and displaying one or more second output parameter values or a data value having been derived thereof in the $4^{th}$ cell at the same time. The first output parameter value is the result of executing the specified spreadsheet-function on a first set of input parameter values and the second output parameter value is the result of executing the specified spreadsheet-function on a second set of input parameter values.

According to embodiments, displaying the one or more first and second output parameter values or a data value having been derived thereof in a $3^{rd}$ and a $4^{th}$ cell at the same time comprises the steps of:

Calculating one or more first output parameter values by using, for each of the one or more formal input parameters, a first input parameter value as input, each first input parameter value being displayed in a $5^{th}$ cell, whereby each first input parameter value, each first output parameter value and the data content of all cells specifying the function body of the specified spreadsheet-function are stored in a first storage area in association with the cell said stored data values and data contents were derived from, Displaying the one or more first output parameter values or a data value having been derived thereof in the $3^{rd}$ cell, Calculating one or more second output parameter values by using, for each of the one or more formal input parameters, a second input parameter value as input, each second input parameter value being displayed in an $6^{th}$ cell, whereby each second input parameter value, each second output parameter value and the data content of all cells specifying the function body of the specified spreadsheet-function are stored in a second storage area in association with the cell said stored data values and data contents were derived from, and Displaying the one or more second output parameter values or a data value having been derived thereof in the $4^{th}$ cell.

According to embodiments of the invention, executing the specified spreadsheet-function an nth time on an nth set of input parameter values comprises the following steps:

Calculating one or more nth output parameter values by using, for each of the one or more formal input parameters, an nth input parameter value as input, each nth input parameter value being displayed in an $(2n+12)^{th}$ cell, whereby each nth input parameter value, each nth output parameter value and the data content of all cells specifying the function body of the specified spreadsheet-function are stored in an nth storage area in association with the cell said stored data values and data contents were derived from, and Displaying the one or more nth output parameter values or a data value having been derived thereof in an $(2n+11)^{th}$ cell.

According to embodiments of the invention being based on any of the implementation variants A1, A2, B or other, a storage area can be an element of a linked list, an entry of a hash-map, an element of a queue, a frame of a stack, in particular of a LIFO stack, and the like.

According to some embodiments of the invention being particularly suited for executing recursive spreadsheet-functions, the first storage area is a first stack frame of a LIFO stack and the second storage area is a second stack frame of said stack. In case the spreadsheet-function is executed n times, the numerical value of n being larger than 2, the nth storage area is part of or constitutes an nth stack frame of said stack.

Executing a Spreadsheet-Function by Means of a Spreadsheet-Function Formula

According to preferred embodiments of the invention, a reusable spreadsheet-function is specified by specifying at least one formal input parameter, one formal output parameter and a function body. A function body comprises instructions for processing data values assigned to each of the formal input parameters. The instructions of the function body assign the data value calculated as a result to the formal output parameter. The formal output parameter returns said value as the result of the function. A data value assigned to a formal input parameter is called 'input parameter value'. When a spreadsheet-function specified according to embodiments of the invention is executed, an input parameter value is assigned to each formal input parameter. The calculation steps specified in the function body are applied on the input parameter value(s) of the spreadsheet-function and an output parameter value is calculated based on the at least one input parameter value.

According to preferred embodiments of the invention, a spreadsheet-function formula representing the specified spreadsheet-function is generated automatically as a result of the specification of said spreadsheet-function. The specification of the spreadsheet-function and the automated generation of a corresponding spreadsheet-function formula can be triggered e.g. by an interaction of a user of the spreadsheet application with a graphical user interface element.

According to embodiments, as a result of the specification of the spreadsheet-function, the generated spreadsheet-function formula is automatically inserted into the $7^{th}$ cell having been used during the specification of the spreadsheet-function. According to embodiments, the spreadsheet-function formula inserted to the $7^{th}$ cell could be of the following syntax:

SUBCALC(<FOP><Source1><FIP1>, . . . , . . . , <Source_n><FIPn>), wherein 'SUBCALC' is a new keyword otherwise not used in spreadsheet formulas of the spreadsheet document.

Depending on the embodiment of the invention, a user can assign a new name to the spreadsheet-function, e.g. by means of a special command. A special command is, for example:

DECLARE SUBCALC FOO
(<FOP><FIP1>, . . . , . . . ,<FIPn>).

A spreadsheet-function formula hides complexity from a user: the processing instructions comprised in a multitude of cells are represented in one single cell comprising said spreadsheet-function formula.

Such a named spreadsheet-function can be executed and reused by writing or copying the name of the spreadsheet-function into another cell and editing said other cell, thereby specifying a spreadsheet-function formula comprising the function name and references to still other cells.

In edit mode, a user can replace the alphanumeric strings representing each of the <Source1>, . . . , <Source_n> placeholders by references to cells comprising a new set of input parameters.

<FOP> represents a formal output parameter, <FIP1> a first formal input parameter and <FIPn> an nth formal input parameter of the spreadsheet-function represented by the spreadsheet-function formula. A data value assigned to the FOP placeholder is returned by the spreadsheet-function formula.

Each of the <Source1>, . . . , <Source_n> placeholders can be replaced by a reference to another cell, said other comprising a data value to be used as input parameter value for calculating a result by said spreadsheet-function. Said data values are assigned to the formal input parameters <FIP1>, . . . , <FIPn>. The data content of the new cell referenced by <Source1> is assigned to formal input parameter <FIP1>, and the data content of the new reference <Source_n> is assigned to formal input parameter <FIPn>.

According to embodiments of the invention, a user can create assignments between each formal input parameter of a spreadsheet-function and a particular cell by replacing a placeholder <Source1>, . . . , <Source_n> of a spreadsheet-function formula representing a specified spreadsheet-function by a reference to said cell.

Thereby, a user can determine that the data values contained in said cells are used as input parameter values for calculating an output parameter value.

According to embodiments of the invention wherein an array of first cells are referenced by an array formula of a $7^{th}$ cell, the <FOP> placeholder comprises a reference to an array of first cells.

According to embodiments of the invention, specifying a spreadsheet-function formula in a $3^{rd}$ cell implies creating a first assignment between a first node of a sub-graph and the $3^{rd}$ cell, the first node being a node data object representing said $3^{rd}$ cell, the sub-graph representing the same spreadsheet-function as the spreadsheet-function formula. According to said embodiments, replacing each formal input parameter source placeholder <Source1>, . . . , <Source_n> by a reference to a $5^{th}$ cell implies creating a second assignment between a second node of said sub-graph and a $8^{th}$ cell, the second node being a node data object representing said $5^{th}$ cell.

Nested Spreadsheet-Functions

According to further embodiments of invention, two or more specified spreadsheet-functions are assembled in a way allowing the specification and execution of nested spreadsheet-functions. A 'nested' spreadsheet-function is a spreadsheet-function which comprises in its function-body computer-implemented instructions triggering the execution of the same or another spreadsheet-function. The process of triggering the execution of a spreadsheet-function will in the following be referred to as 'calling' a spreadsheet-function. The called spreadsheet-function may use one or more intermediate results provided by the calling spreadsheet-function as input. The called spreadsheet-function returns its result to the calling spreadsheet-function. The calling spreadsheet-function further processes the result provided by the called spreadsheet-function in order to generate a final calculation result.

According to further embodiments of the invention, a $10^{th}$ cell belonging to a first set of cells specifying the function body of a first spreadsheet-function comprises a spreadsheet-function formula, the spreadsheet-function formula representing a second spreadsheet-function. The spreadsheet-function formula may have been specified by the computer-implemented method according to any of the described embodiments of the invention. When the first spreadsheet-function is executed, said first spreadsheet-function calls the second spreadsheet-function specified by the spreadsheet-function formula of the $10^{th}$ cell as a sub-routine.

According to further embodiments of the invention, the second spreadsheet-function specified by the spreadsheet-function formula of said $10^{th}$ cell represents said first spreadsheet-function. When the first spreadsheet-function is executed, said first spreadsheet-function calls itself as a sub-routine.

The use of nested spreadsheet-functions tremendously reduces the complexity of specifying calculation operations in spreadsheet applications: by means of nested spreadsheet-functions specified according to embodiments of the invention, it is possible also for users of spreadsheet-applications not skilled in any programming language to specify various sub-routines such as interest rate calculation, particular accounting procedures or scientific calculations for specific tasks. Once specified, a spreadsheet-function formula can easily be reused, thereby avoiding code duplication.

According to embodiments of the invention, nested spreadsheet-functions use a termination criterion limiting the number of steps to be executed. Said termination criterion is in particular a condition, e.g. an if-clause such as =IF(input==0, FOO(input−1), 0). Before a called spreadsheet-function is executed, the condition is evaluated, and the called spreadsheet-function is executed only in case the evaluation returns 'true'. By using a function call in an IF-clause it is guaranteed that the call is only executed in case the condition returns 'true' as result. The called spreadsheet-function can be another spreadsheet-function or the calling function. The call can be, for example, F(input==0, FOO(input−1), 0)'.

According to preferred embodiments, a stack frame of a LIFO stack is used for storing the one or more output parameter values and the corresponding one or more input parameter values and intermediate result values, thereby allowing the execution of nested spreadsheet-functions, including recursive spreadsheet-functions. According to said embodiments, each stack frame corresponds to a recursion level. According to embodiments which support a recursive execution of the specified spreadsheet-function, the first, second and nth storage areas of the implementation variants A1, A2 and B constitute or belong to a stack frame of a LIFO stack. Computer-interpretable instructions encoding the specified spreadsheet-function are stored in a stack frame of a LIFO stack, receive their input, execute the specified spreadsheet-function on the received input, and pass information back to the stack frame currently in charge. The currently executed stack frame includes the address of the next processing step of the calling spreadsheet-function. The calling spreadsheet-function further processes the received result of the called program.

FURTHER EMBODIMENTS

According to other embodiments, data structures are used to organize the storage areas which support the parallel processing of multiple independent instances of a spreadsheet-function at the same time. Such data structures are in particular maps, e.g. a hash map. Any of the implementation variants A1, A2 and B are, according to embodiments of the invention, implemented based on a storage area being an element of a map data structure.

According to further embodiments of the invention, at least one of the $5^{th}$ cells used for providing an input parameter value for calculating a result by a first spreadsheet-function FOO does not comprise a data value but a spreadsheet-function formula, said spreadsheet-function formula specifying a second spreadsheet-function BAR. Accordingly, it is possible to use the results generated by the spreadsheet-function BAR as input parameter value of the spreadsheet-function FOO.

Displaying a formula which represents the spreadsheet-function e.g. within the $3^{rd}$ cell in an edit mode is advantageous, because it provides the user of the spreadsheet-application with the option to use that formula in a multitude of ways. The user can, for example, copy said formula and edit it. The user can replace references which formerly referred to $5^{th}$ cells and replace said references by references to one or more $6^{th}$ cells. In this way, highly complex, nested spreadsheet-functions can be defined and executed without the necessity to duplicate code and without the necessity to use a programming language.

According to some embodiments of the invention, the data values, references and/or formulas specified in cells belonging to the user-selected second set of cells which are referenced by the first cell via one direct reference or via one or more reference chains are used to automatically specify the spreadsheet-function formula. This is advantageous, because it is not convenient for a human to specify highly complex calculations within one single formula cell. It is much more convenient for a human being to specify complex calculations via multiple cells comprising data values and formulas referencing each other. The disadvantage of using multiple formulas in order to specify complex calculations and functions in spreadsheet applications is that the multitude of formulas requires a multitude of cells, thereby filling a spreadsheet document with redundant data if said cells are copied. If the specified calculation is to be applied more than once based on multiple different input data values, it is not convenient to use a multitude of connected formula cells, because duplicating said cells may introduce errors, reduce maintainability and fills the spreadsheet document with lots of redundant data. Embodiments of the invention allow a user to specify complex calculations by means every user of a spreadsheet application is familiar with. The user is not required to be skilled in any programming language. After having selected said multitude of cells, the user can trigger the automated extraction of calculation instructions, data values and operations specified within said multitude of cells. As a result, one complex spreadsheet-function formula fitting into one single cell is automatically generated. The user can reuse that formula, thereby reusing that complex calculation without duplicating the multitude of cells.

In another aspect, the invention relates to a computer-readable, non-transitory storage medium containing instructions that when executed by a processor cause the processor to perform a method according to any of the described embodiments of the invention described above.

In another aspect, the invention relates to a computer system comprising
 a processor,
 a computer-readable non-transitory storage medium containing instructions that when executed by the processor cause the processor to perform a method according to any of the described embodiments of the invention,
 a graphical user interface for displaying the spreadsheet, the one or more input parameter values and the one or more output parameter values or derivatives thereof generated by executing the spreadsheet-function.

Embodiments of the invention may be provided as plug-in or add-in of a spreadsheet application program, e.g. EXCEL. According to further embodiments, the present invention is provided as integral part of a spreadsheet application or as an independent software program having read and write access to a spreadsheet application.

BRIEF DESCRIPTION OF THE DRAWINGS

In the following, embodiments of the invention are described by way of example, only making reference to the drawings in which:

FIG. 1 depicts a flowchart of a computer-implemented method for specifying 101 a spreadsheet-function without using a programming language. The specification 101 of the spreadsheet-function comprises the following steps:

Figure 1:
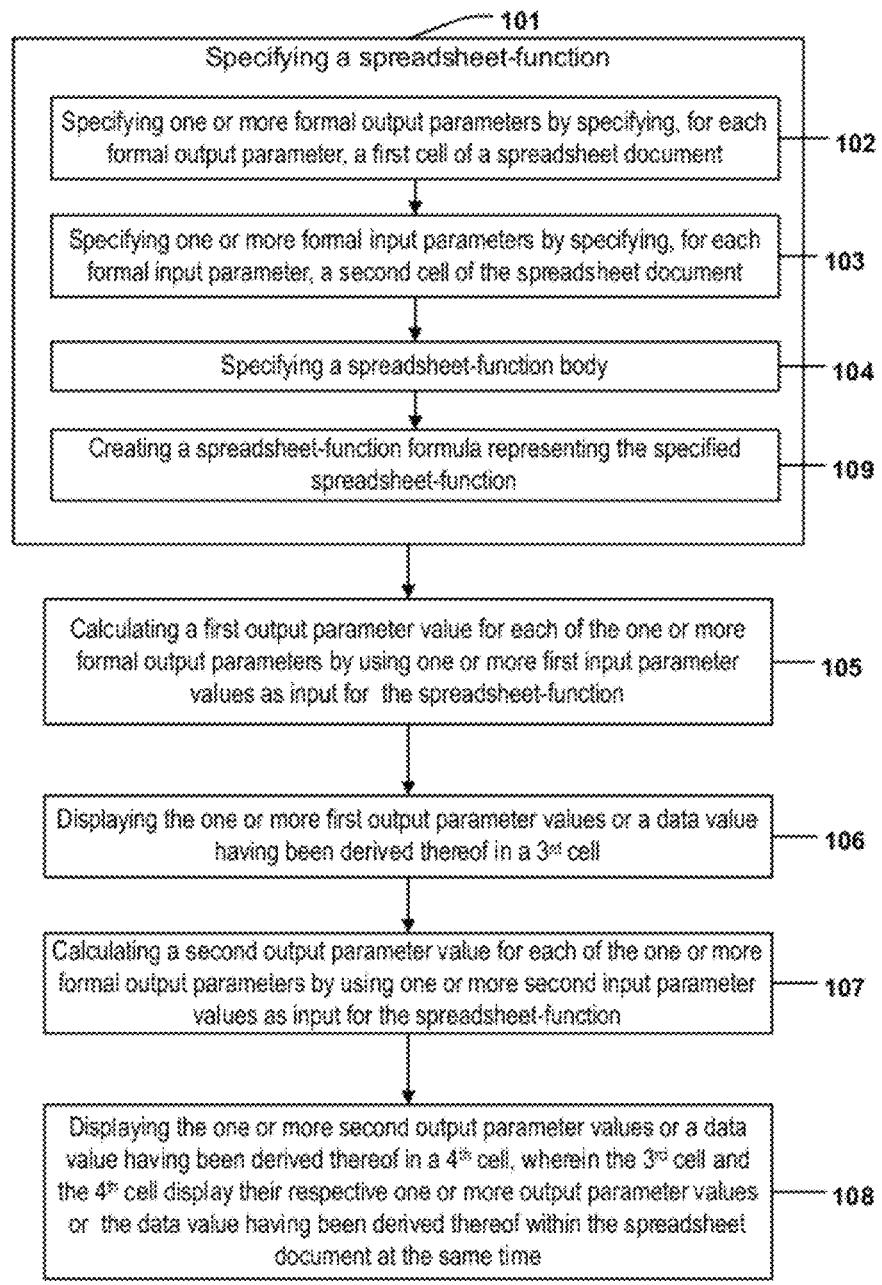
FIG. 1 depicts a flow-chart of a computer-implemented method for specifying a spreadsheet-function and displaying two result values at the same time.

In step 102, a formal output parameter is specified by specifying a first cell of a spreadsheet document. Depending on the embodiment of the invention, the first cell can be specified e.g. by means of a GUI, e.g. a dialog window 500.

According to further embodiments, the user may select a cell within a spreadsheet document, the cell comprising the result of a complex calculation. The user may determine the role of said selected cell as 'first cell' e.g. by selecting an item of a context menu. Said context menu is displayed to the user upon clicking on the selected cell with the right mouse button.

According to further embodiments, specifying the one or more first cells for specifying the one or more formal output parameters is specified semi-automatically via the following steps:
  Selecting a set of cells, e.g. by the user, as indicated e.g. by the dotted line 402 in FIGS. 4a-4d,
  Automatically determining all cells within said set of cells being referenced by one or more cells not belonging to said set of cells
  in case more than one referenced cells are determined in the previous step, selecting, by the user, one of said determined cells to be used as first cell, or selecting an array of cells as array of first cells in case said array of cells is referenced by an array formula, the array formula being contained in a cell not belonging to the selected set of cells.

In step 103, one or more formal input parameters are specified by specifying, for each formal input parameter, a second cell. Depending on the embodiment of the invention, the second cells can be specified by the user, e.g. by means of a graphical user interface. According to said embodiments, the system checks, whether each of the specified second cells is referenced by the first cell directly or via at least one chain of references.

According to further embodiments, the one or more second cells are determined automatically by the system after the specification of a first cell or an array of first cells. The one or more determined second cells have to meet several conditions to be considered as 'second cell' (see FIG. 2):
  each cell belongs to the selected set of cells
  each cell is referenced by one or more cells not belonging to the selected set of cells
  each cell is referenced by the first cell directly and/or via at least one chain of references.

In step 104, the spreadsheet-function body is specified. According to preferred embodiments of the invention, all cells belonging to the one or more cells connecting the first cell with each of the one or more second cells via a reference and/or at least one chain of references are used as cells constituting the function-body of the spreadsheet-function.

After having specified the first formal output parameter, one or more formal input parameters and the function-body, a new spreadsheet-function has been specified. In step 105, a first output parameter value is calculated by the specified spreadsheet-function. The spreadsheet-function uses one or more first input parameter values as input. Each input parameter value is assigned to one formal input parameter. Each first input parameter value is a data value displayed in a $5^{th}$ cell, each $5^{th}$ cell being assigned to a formal input parameter. In step 106 the calculated first output parameter value is displayed in a $3^{rd}$ cell according to an assignment of said $3^{rd}$ cell to the formal output parameter.

In step 107, the second output parameter value is calculated by the specified spreadsheet-function, the spreadsheet-function using one or more second input parameter values as input. Each second input parameter value is a data value displayed in the $6^{th}$ cell. Each $5^{th}$ cell is assigned to a formal input parameter of the specified spreadsheet-function.

In step 108, the calculated second output parameter value is displayed in a $4^{th}$ cell. The $3^{rd}$ and the $4^{th}$ cell display their respective one or more output parameter values or a data value having been derived thereof within one spreadsheet document at the same time. In case the specified spreadsheet-function is applied n times, e.g. on n different sets of input parameter values, n output parameter values are calculated and can be displayed in n different cells of the spreadsheet document at the same time. This allows the user to get a quick overview of the impact of each input parameter value on the calculated result. As the cells specifying the function-body of the specified spreadsheet-function do not need to be duplicated, it is ensured that the user is not disturbed by redundant data.

Figure 2:
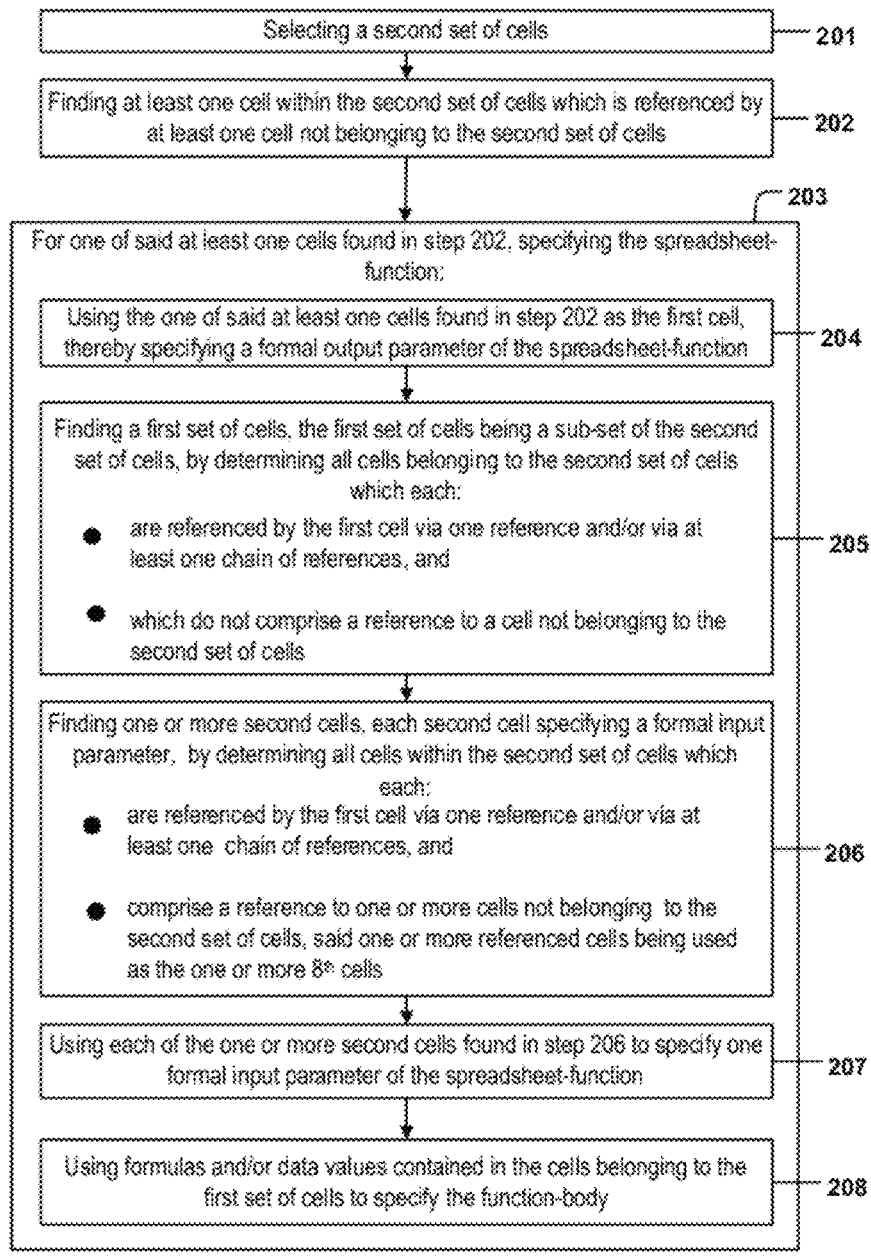
FIG. 2 depicts a flow-chart of a computer-implemented method for specifying a spreadsheet-function, the method being based on selecting a second set of cells.

FIG. 2 depicts the flowchart of embodiments of the computer-implemented method for specifying a spreadsheet-function. The embodiment depicted in FIG. 2 is based on specifying a spreadsheet-function by selecting a set of cells in the following referred to as 'second set of cells'.

In step 201, a second set of cells is selected in a spreadsheet-document. According to preferred embodiments of the invention, the selection is performed by the user of the spreadsheet-application. The selected cells comprise a multitude of connected cells specifying a calculation the user wants to reuse. In FIGS. 4a-4d, the selected second set of cells B14:D23 is surrounded by a dotted box 402.

In step 202, at least one cell 441 belonging to the second set of cells is found which is referenced by at least one cell 440 not belonging to the second set of cells. According to preferred embodiments of the invention, step 202 is executed automatically. Each of the one or more found cells can be used as first cell specifying a formal output parameter. Accordingly, for each cell found in step 202, a spreadsheet-function can be specified. In case m cells have been found in step 202, it is possible, according to embodiments of the invention, to specify m spreadsheet-functions. In case an array of cells has been found to be referenced by an array formula, each cell of said array of cells is used as first cell.

Depending on the embodiment of the invention, the system executes the steps 204-208 for each of the m cells found in step 202. According to further embodiments, the user may select one or more of the m cells found in step 202. In this case, a spreadsheet-function is specified for each of said selected cells.

The step 203 for specifying one spreadsheet-function comprises the sub-steps 204-208. In the following, the step 203 of specifying of one spreadsheet-function for one of the one or more cells found in step 202 is described.

In step 204, exactly one of the one or more cells found in step 202 is used as first cell. Thereby, said first cell specifies the formal output parameter of the spreadsheet-function.

In step 205, the function-body of the spreadsheet-function to be specified is specified by finding a first set of cells. The first set of cells is a sub-set of the second set of cells selected in step 201. The first set of cells is found by determining all cells belonging to the second set of cells which are referenced by the first cell used in step 204 via one direct reference and/or via one or more chains of references. Each cell belonging to the second set of cells must not comprise a reference to a cell not belonging to the second set of cells; otherwise said cell is not considered as belonging to the first set of cells in step 205. According to preferred embodiments of the invention, the step of finding the first set of cells is executed automatically.

In step 206, one or more second cells are found. The one or more second cells are automatically determined as cells which belong to the second set of cells if said cells meet the following requirements:
  each second cell is referenced by the cell used in step 204 as first cell via one reference and/or via one or more chains of references
  each second cell comprises a reference to a cell not belonging to the second set of cells, each referenced cell being used as a $8^{th}$ cell, a $8^{th}$ cell comprising data values to be used as input parameters when executing and specifying the spreadsheet-function.

According to preferred embodiments of the invention, the step of finding the one or more second cells is executed automatically.

In step 207, each of the one or more second cells found in step 206 is used to specify one formal input parameter of the spreadsheet-function to be specified.

In step 208 formulas and/or data values specified within the cells belonging to the first set of cells are used to specify the function body of the spreadsheet-function to be specified.

Figure 3:
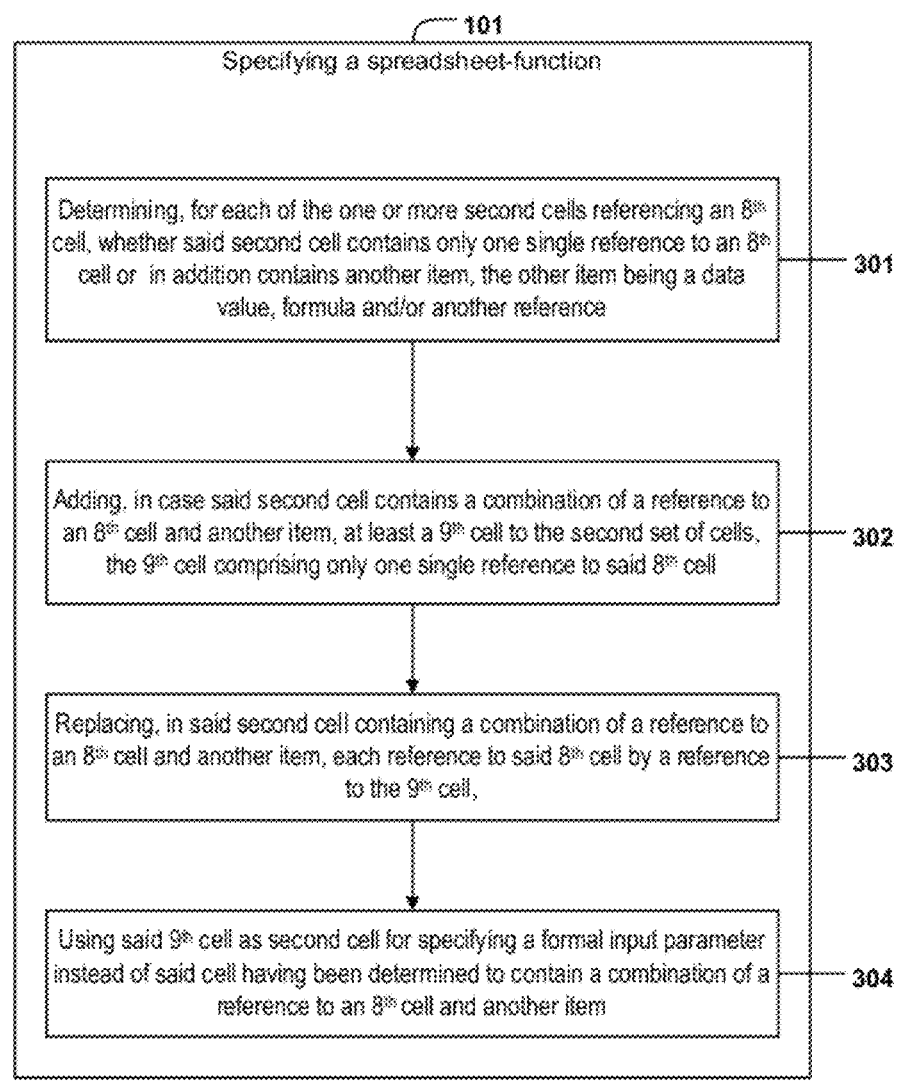
FIG. 3 depicts a flowchart of the computer-implemented method described in FIG. 1 comprising some additional steps.

FIG. 3 depicts a flowchart of the step 101 depicted in FIG. 2 which comprises, according to some embodiments of the invention, some additional sub-steps 301-304.

In step 301 it is determined automatically, for each of the one or more second cells found in step 206, whether the second cell contains only one single reference to a $8^{th}$ cell or in addition contains another item. The other item can be e.g. a data value or an additional reference to the same $8^{th}$ cell or another cell.

In case said determined second cell contains a combination of a reference to a $8^{th}$ cell and another item, in step 302 at least one $9^{th}$ cell is added to the second set of cells, the $9^{th}$ cell comprising only one single reference to said $8^{th}$ cell. The $9^{th}$ cell can be added, for example, by inserting an additional row or an additional column into the spreadsheet document. According to preferred embodiments, said additional row or column is inserted into that area of a worksheet which comprises the second set of cells. According to further embodiments of the invention, an empty cell belonging to the second set of cells may also be used as $9^{th}$ cell. Only in case there does not exist any empty cell within the second set of cells, the insertion of a new $9^{th}$ cell is performed by inserting an additional row or column.

In step 303, each reference to said $8^{th}$ cell contained within each of the one or more second cells determined in step 301 is replaced by a reference to the $9^{th}$ cell. In step 304, said $9^{th}$ cell is used as second cell for specifying a formal input parameter instead of the second cell having been determined in step 301 to contain a combination of a reference to a $8^{th}$ cell and another item.

By executing the steps 301-304 it is guaranteed that each second cell specifying a formal input parameter comprises only one reference to another cell. A formal input parameter of a function is a placeholder for a particular data value. Therefore, according to embodiments of the invention, multiple references or the combination of a reference and another item in a cell fulfilling all conditions specified in step 206 are resolved by introducing the $9^{th}$ cell.

According to further embodiments of the invention, the system automatically specifies an empty cell belonging to the second set of cells to be used as $9^{th}$ cell instead of inserting a new $9^{th}$ cell.

According to further embodiments of the invention, the system prompts the user of the spreadsheet-function to manually resolve problems arousing from a second cell comprising another item in addition to the reference to a $8^{th}$ cell. The completion of specifying the spreadsheet-function may be prohibited until said ambiguities are resolved and each of the one or more second cells only comprises exactly one reference to a $8^{th}$ cell.

Figure 4A:
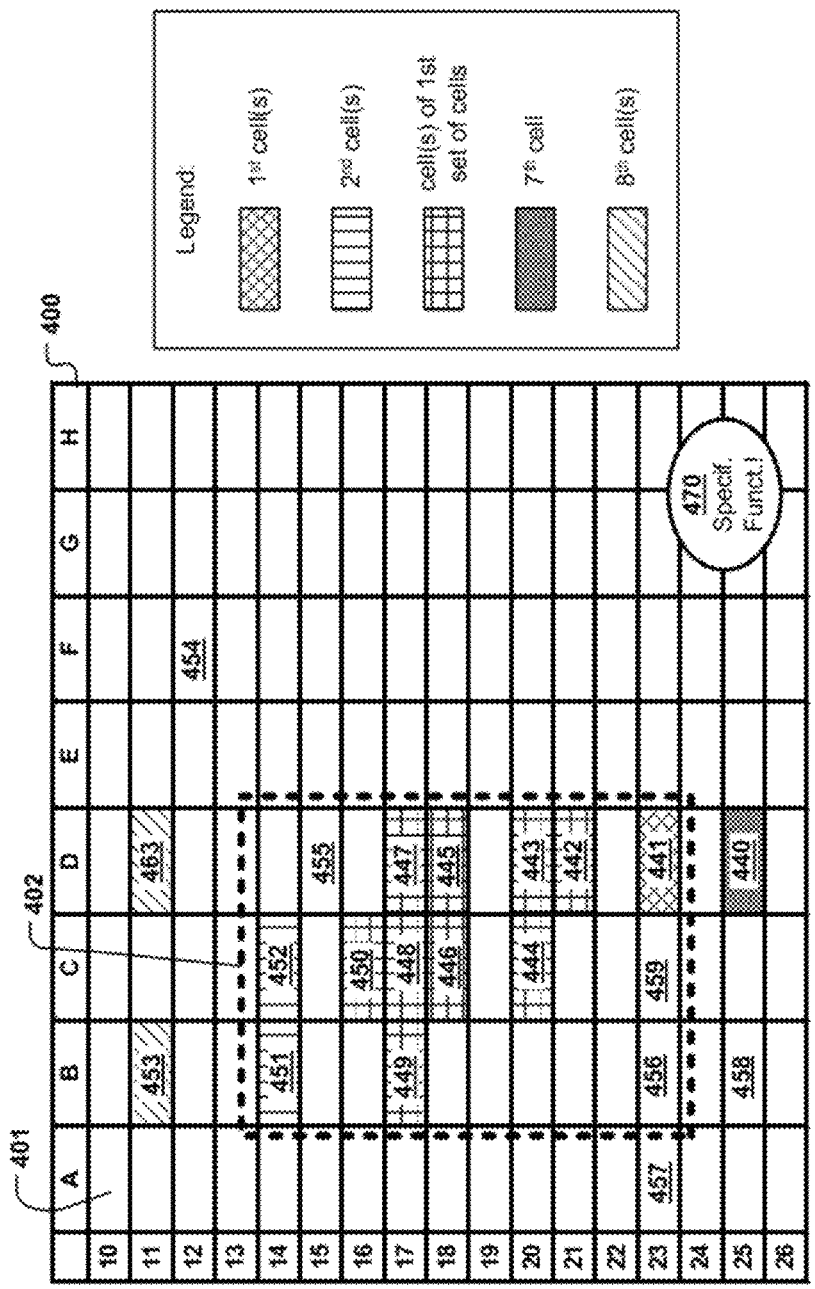
FIGS. 4a-4d depict a section of a worksheet of a spreadsheet-document comprising cells, some of the cells being used for specifying a spreadsheet-function.
Figure 4B:
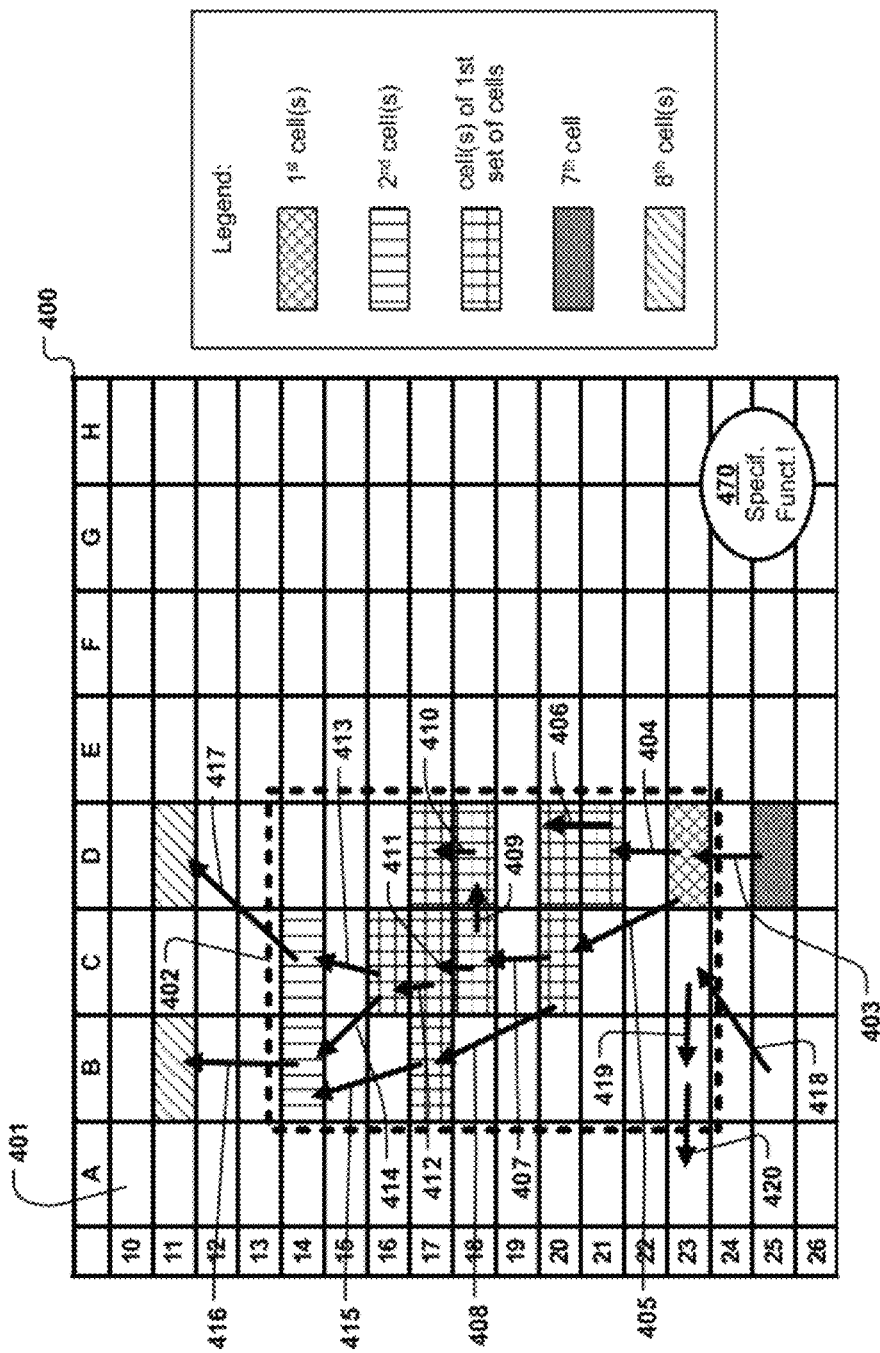
Figure 4C:
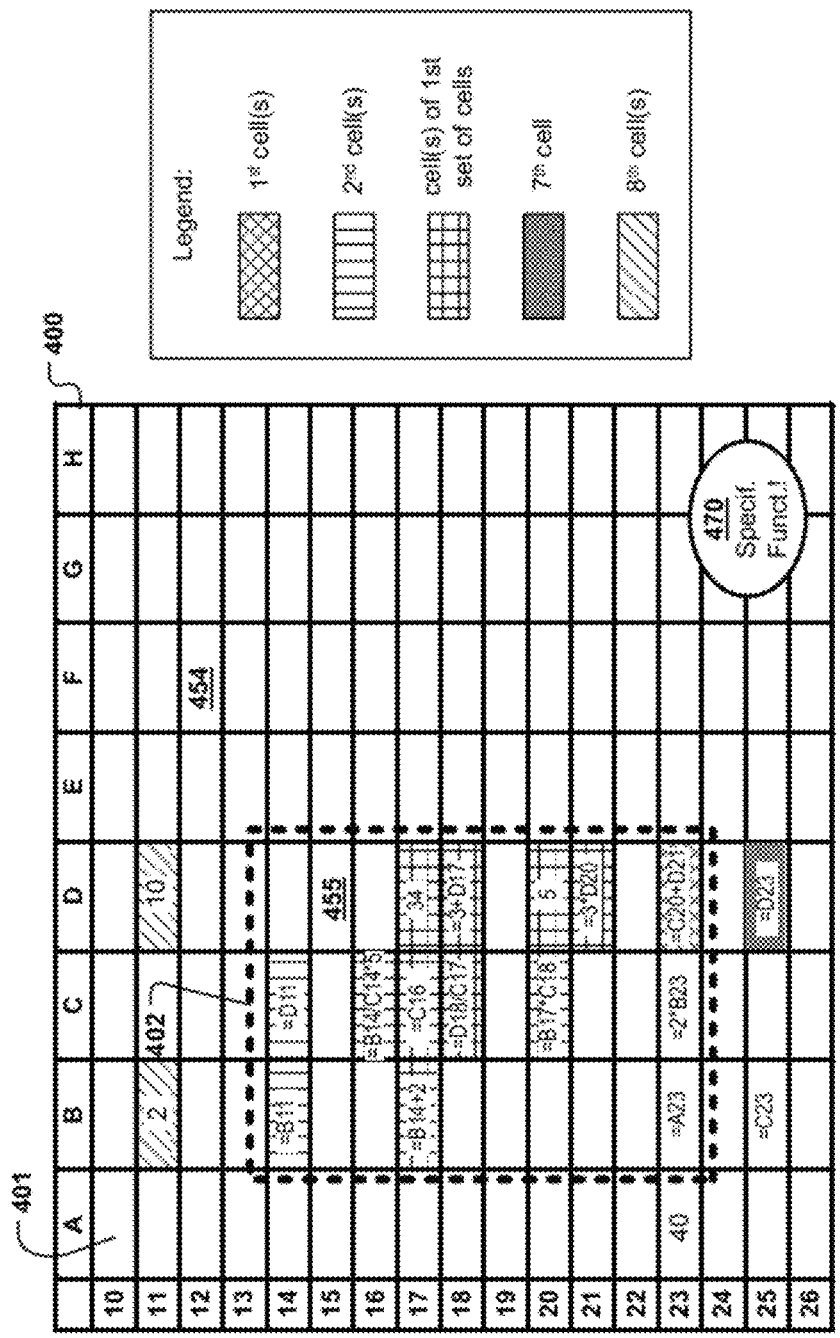
Figure 4D:
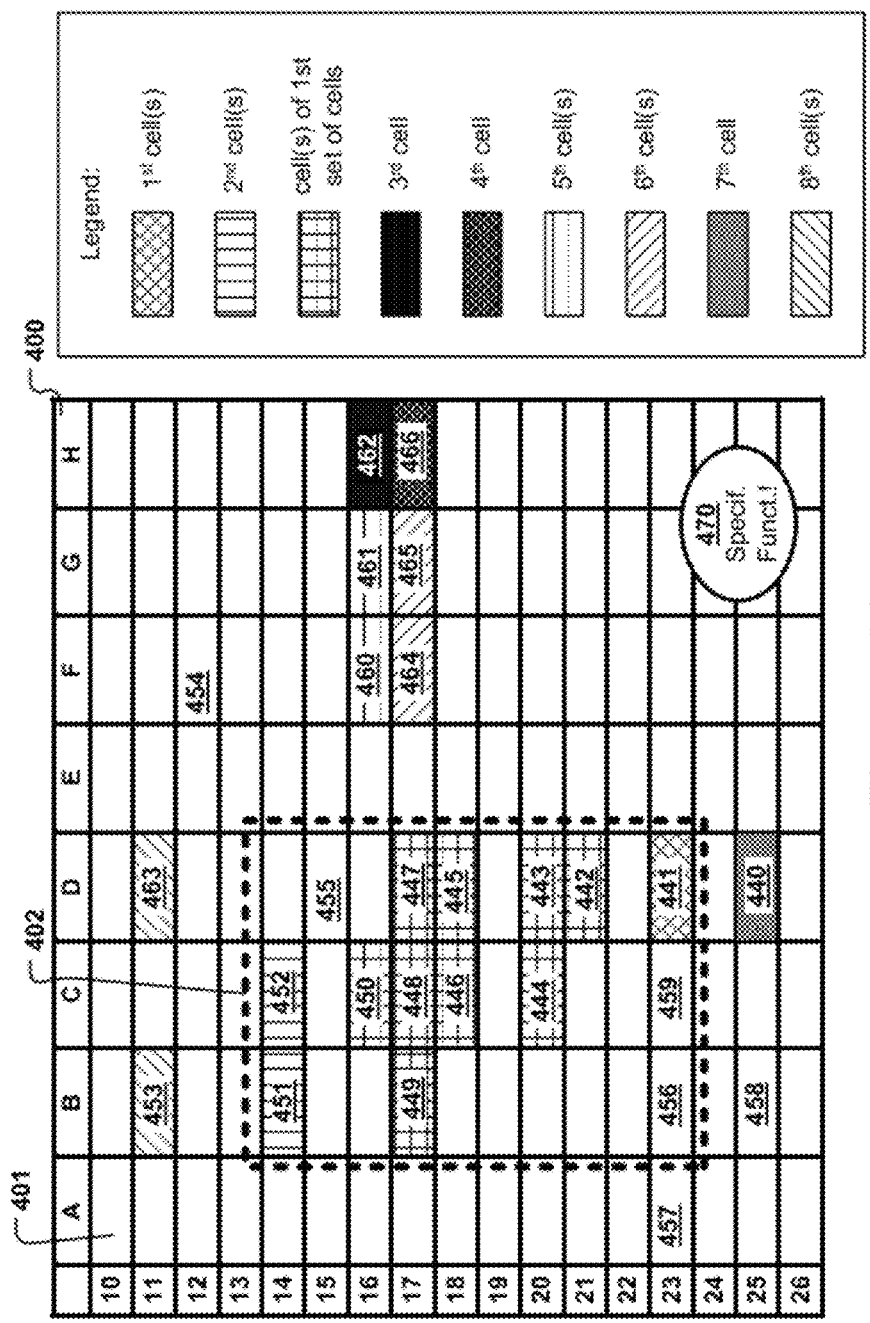

FIGS. 4a-4d depict a part of a worksheet of a spreadsheet-document which comprises cells and wherein some of said cells are used for specifying a spreadsheet-function. FIG. 4b displays several chains of references, wherein each reference is represented as a black arrow. FIGS. 4a-4d depict the same section of a spreadsheet worksheet but illustrate different aspects and/or different view modes. FIG. 4a displays reference numbers which will in the following be used to refer to the respective cells of FIG. 4b, 4c and FIG. 4d. FIG. 4c displays the spreadsheet worksheet section in edit mode. In edit mode, the formulas and/or data values are shown instead of the calculated result values. FIG. 4d illustrates how the specified spreadsheet-function can be applied on a first and a second set of input parameters to calculate a first and a second result.

FIG. 4a displays a first cell 441, a $7^{th}$ cell 440, and 7 cells 442, 443, 444, 445, 446, 447, 448, 449, 450 constituting the first set of cells, the first set of cells specifying the function body of the spreadsheet-function. FIG. 4a further displays two second cells 451, 452, two $8^{th}$ cells 453, 463 and a second set of cells. The second set of cells comprises all cells ranging from B14 to D23. The second set of cells is indicated in FIGS. 4a-4d by the dotted frame border. The second set of cells is, according to embodiments of the invention, selected by the user. The cells of each cell type are hatched according to the legend displayed on the right side of the figure.

FIG. 4a further depicts a GUI element 470. The GUI element 470 triggers, upon an interaction of the user with said element, the specification of the spreadsheet-function based on the second set of cells. For example, a user can select the second set of cells by selecting an area with in a spreadsheet worksheet with the left mouse button. Next, he can press the graphical user interface element 470 to trigger the automated specification of a spreadsheet-function. The graphical user interface element 470 can be a button, an item of a context menu, an item of the main menu, a pop-up window or the like. Accordingly, the position of the GUI element 470 is not confined to the lower right side of a spreadsheet application window as depicted in FIGS. 4a-4d.

FIG. 4b represents references in the form of black arrows. A cell may comprise only one reference to another cell. This is, for example, the case for cell 451 which comprises a reference to cell 453. Said reference is indicated by arrow 416. A cell may also comprise more than one reference to other cells, as depicted for example by the black arrows 404 and 405. The first cell 441 comprises a formula '=C20+D21' (see FIG. 4c) which references cells 442 and 444.

At first, the second set of cells indicated by the dotted line 402 surrounding said set of cells, has to be selected, e.g. by the user of the spreadsheet application. Next, the system determines all cells belonging to said second set of cells which are referenced by a cell not belonging to the second set of cells. In the example depicted in FIGS. 4a to 4d, two such cells exist: cell 441 and cell 459. Cell 440, lying outside the second set of cells, references cell 441 via reference 403. Cell 458, lying outside the second set of cells, references cell 459 via reference 418.

As each spreadsheet-function corresponds to one formal output parameter, each of said two cells 441 and 456 can be used to specify a formal output parameter of a spreadsheet-function as starting point for specifying the function-body and for specifying the one or more formal input parameters of said spreadsheet-function.

A first spreadsheet-function can be specified by following all references starting from cell 441. The function-body of said first spreadsheet-function is constituted by all cells 442-450 being referenced by the first cell 441 via one reference and/or via one or more chains of references and which do not comprise a reference to a cell not belonging to the second set of cells. For example, cell 450 can be reached starting from the first cell 441 via the chain of references 405, 407, 411, and 412. Cell 450 is therefore automatically determined to be a member of a first set of cells constituting the function-body of the spreadsheet-function to be specified. Cell 452 can also be reached starting from the first cell 441 via at least one chain of references. As cell 452 comprises a reference to cell 463, cell 452 is automatically determined not to belong to the first set of cells but to constitute a second cell, thereby specifying a formal input parameter of the spreadsheet-function to be specified. The cells acting as first cell, as second cell or as a cell specifying the function-body of a spreadsheet-function are determined by determining references connecting cells belonging to the second set of cells with cells not belonging to the second set of cells, and by following all references starting from the determined first cell. Said evaluation of references can be triggered by an interaction of a user with the GUI element 470 after the user has selected the second set of cells. The cells 453 and 463 being referenced by a second cell and which do not belong to the second set of cells are considered as $8^{th}$ cells.

A second spreadsheet-function could, according to embodiments of the invention, be automatically specified by following all references 418, 419, and 420 starting from cell 459. In the depicted example, the first set of cells constituting the function body of said second spreadsheet-function would be empty.

FIG. 4c depicts the same section of the spreadsheet worksheet as depicted in FIGS. 4a and 4b in edit mode. Cell 455 is an empty cell belonging to the second set of cells. According to embodiments of the invention, cell 455 could be used as $9^{th}$ cell in case a second cell comprises another item in addition to a reference to a $8^{th}$ cell. According to other embodiments of the invention, cell 455 may represent a $9^{th}$ cell which was added to the second set of cells e.g. by adding a new line 15 into the spreadsheet document and adapting all references contained therein.

The formula references depicted in FIG. 4c correspond to the black arrows displayed in FIG. 4b. Cell 447 comprises the data value '34', cell 443 comprises the data value 'five' and all remaining cells belonging to the first set of cells comprise a formula. The totality of data values and formulas contained in the first set of cells specify the function-body of the spreadsheet-function.

According to further embodiments of the invention (not shown), the reference contained in the $7^{th}$ cell is replaced, after the spreadsheet-function has been specified, by the automatically generated spreadsheet-function formula representing the specified spreadsheet-function. The spreadsheet-function formula comprises all data values and operations specified within the first cells and the first set of cells constituting the function body.

According to other embodiments of the invention, said spreadsheet-function formula is inserted into an empty cell, thereby preserving the reference contained in the $7^{th}$ cell.

According to one embodiment, the generation of the spreadsheet-function formula comprises the step of subsuming the formulas contained in the first cell and in the first set of cells into one single, complex spreadsheet-function formula.

Referring to the example depicted in FIG. 4c, an automatically extracted 'subsuming' spreadsheet-function formula would be:

$$=((<FIP1>+2)*((3+34)/(<FIP1>/<FIP2>*5))18)+(3*(5))$$

The term 'FIP1' denotes the first formal input parameter represented by the second cell 451. The term 'FIP2' denotes the second formal input parameter represented by the second cell 452.

The content of said spreadsheet-function formula can be manually edited, thereby replacing formal input parameter placeholders by references to cells containing input data values. An edited formula can be, for example:

$$=((<B11>+2)*((3+34)/(<B11>/<D11>*5))18)+(3*(5))$$

As said 'subsuming formula' can easily become very complex and hard to maintain, preferred embodiments generate spreadsheet-function formulas whose function body is still specified by a plurality of cells belonging to the first set of cells. Said spreadsheet-function formulas are represented within one single cell by means of a keyword such as 'SUBCALC' or a function name such as 'FOO'.

Therefore, according to preferred embodiments of the invention, the complexity of the generated spreadsheet-function formula is hidden by representing all operations involved in calculating a result by means of a keyword or function name, e.g. 'SUBCALC' or 'FOO'.

FIG. 4d displays the same section of the worksheet displayed also in FIGS. 4a-4c, which contains a first and a second set of input parameter values and a first and a second calculated result.

In order to reuse a specified spreadsheet-function, the following steps can be executed:
Copying the spreadsheet-function formula generated during the specification of the spreadsheet-function into a cell, e.g. into cell 462,
Replacing each formal input parameter FIP1, FIP2 of the copied spreadsheet-function formula by a reference to a cell comprising a first input parameter value, e.g. cells 460 and 461.
Upon an execution of the specified spreadsheet-function, the first input parameter values are used to calculate a first output parameter value which is displayed in the $3^{rd}$ cell 462 comprising the spreadsheet-function formula.

Most current spreadsheet applications refresh the content of the current worksheet or all worksheets of a spreadsheet document whenever a user edits a data value. The refresh implies executing the computer implemented instructions specified by all formulas in all cells, including the spreadsheet-function formulas.

The specified spreadsheet-function formula according to some embodiments of the invention is written as:

$$=SUBCALC(<FOP>,<Source1>,<FIP1>,<Source2>,<FIP2>)$$

Wherein 'FOP' is a reference to the first cell having been used for specifying the spreadsheet-function. FOP represents the formal output parameter of the specified spreadsheet-function. By copying the spreadsheet-function formula into e.g. a $3^{rd}$ cell or a $4^{th}$ cell, said cell will display the output parameter value generated by the specified spreadsheet-function on a particular set of input parameter values. The set of input parameter values can be specified by substituting the SourceX placeholders by a reference to a cell comprising an input parameter value.

The string 'FIP1'' represents a first formal input parameter of the specified spreadsheet-function. In this example, the string 'FIP1'' comprises a reference to the second cell 451. Said value must not be changed by the user, otherwise, the spreadsheet-function formula does not represent the specified spreadsheet-function any more.

The string 'FIP2'' represents a second formal input parameter of the specified spreadsheet-function. In this example, the string 'FIP2'' comprises a reference to the second cell 452. Said value must not be changed by the user, otherwise, the edited spreadsheet-function formula does not represent the specified spreadsheet-function any more.

The string 'Source1' represents a reference to a cell comprising a data value to be used as input parameter value for the specified spreadsheet-function. By replacing 'Source1' with a reference of a cell, the data value contained in said cell is assigned to the formal input parameter FIP1 and is used as input parameter value by the specified spreadsheet-function to calculate an output parameter value. In this example, the string 'Source1' is replaced by a reference to the $5^{th}$ cell 460 in order to calculate a first output parameter value.

The string 'Source2' represents a reference to a cell comprising a data value to be used as input parameter value for the specified spreadsheet-function. By replacing 'Source2' with a reference of a cell, the data value contained in said cell is assigned to the formal input parameter FIP2 and is used as input parameter value by the specified spreadsheet-function to calculate an output parameter value. In this example, the string 'Source2' is replaced by a reference to the $5^{th}$ cell 461 in order to calculate a first output parameter value.

By copy-pasting the spreadsheet-function formula into the $4^{th}$ cell 466, the string 'FOP' comprising a reference to the first cell 441, by replacing the string 'Source1' by a reference to the $6^{th}$ cell 464, and by replacing the string 'Source2' by a reference to the $6^{th}$ cell 465, a second output parameter value can be calculated given the input data values contained in cells 464 and 465, the second output parameter to be displayed in the $4^{th}$ cell 466.

The new instance of the spreadsheet-function formula used for calculating the first output parameter value looks like:

=SUBCALC(<441>,<460>,<451>,<461>,<452>);
    (based on reference numbers)=

SUBCALC(<D23>,<F16>,<B14>,<G16>,<C14>);
    (EXCEL Syntax)

The representation of the specified spreadsheet-function in the form of a complex spreadsheet-function formula is particularly advantageous, because the user can use said spreadsheet-function formula in the same way as any other formula of a spreadsheet-document. Users of spreadsheet-applications are used to the syntax and usage of formulas.

The example given in FIGS. 4a-4d illustrates that a user needs to specify a complex calculation in a spreadsheet document only once. After having selected a second set of cells and after having triggered the automated specification of a spreadsheet-function e.g. by interacting with the GUI element 470, according to embodiments of the invention, a spreadsheet-function formula is automatically generated and provided to the user, e.g. by inserting said formula into the $7^{th}$ cell. The spreadsheet-function formula can be reused by the user in a multitude of ways. In particular, the user may copy-paste the spreadsheet-function formula to other cells of the same or another worksheet or another spreadsheet document. The user can replace each of the <Source1> and <Source2> placeholders by a reference to a cell comprising an input parameter value.

According to state of the art spreadsheet applications, a user has to copy-paste all cells contained in the first set of cells each time he wants to apply the formulas specified therein on a different set of input parameters. In case a user of state of the art spreadsheet applications prefers to use the scenario manager of Microsoft Excel, the user has no possibility to see more than one result generated on a particular set of input parameters at the same time. According to embodiments of the invention, the user has the option to specify the spreadsheet-functions and reuse the specified spreadsheet-function, e.g. in the form of a spreadsheet-function formula, without duplicating a multitude of formula cells and without making use of a programming language.

A user can create an arbitrary number n of copies of the specified spreadsheet-function formula and apply it on an arbitrary number n of different sets of input parameter values. According to the example depicted in FIG. 4d, each re-use of the specified spreadsheet-function formula requires only three additional cells: two cells comprising data values for each of the two formal input parameters and one cell comprising a copy of the spreadsheet-function formula referencing said two other cells and displaying the result.

Figure 5:
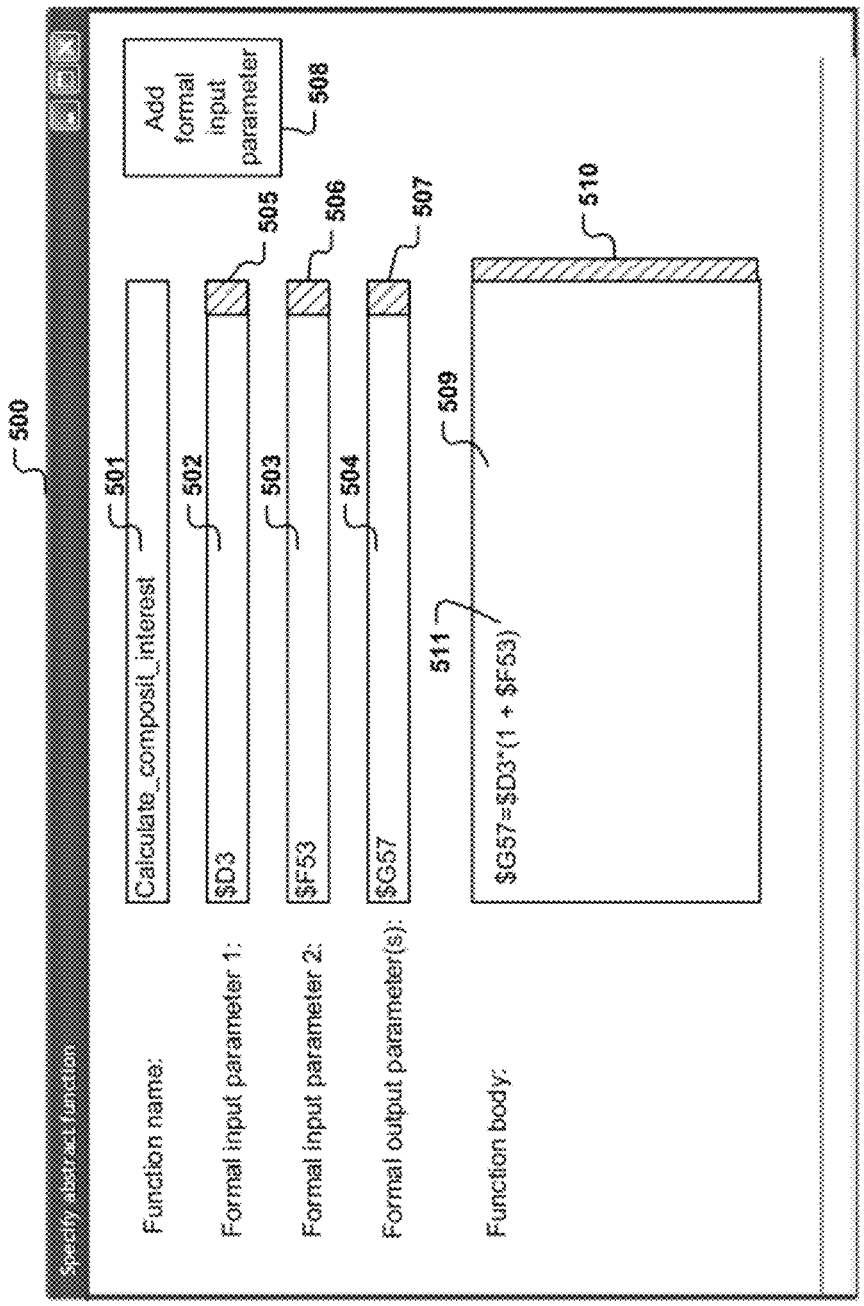
FIG. 5 depicts a dialog window for specifying a spreadsheet-function by means of a GUI element.

FIG. 5 depicts a further embodiment of the invention, according to which a user can specify the spreadsheet-function by means of a dialog window 500. The dialog window 500 comprises a text field 501 for specifying the name of the spreadsheet-function to be specified. The dialog window 500 further comprises a GUI element 504 for specifying the formal output parameter. GUI element 504 can be, for example, a text field for entering e.g. the row and column index of a first cell to be specified. The dialog window 500 further comprises one or more GUI elements 502, 503, each of said one or more GUI elements being used for specifying the formal input parameter. Said GUI element 502, 503 can, for example, be a text field for specifying the row and column index of a second cell.

According to some embodiments, the dialog window 500 further comprises a GUI element 509 for specifying a formula 511 constituting the function body. According to other embodiments, the dialog window does not comprise GUI element 509 as the function body is determined automatically based on a specified first cell and one or more second cells being referenced by said first cell via at least one reference or chain of references.

An additional GUI element 508, e.g. a button, may trigger the integration of additional GUI elements into the dialog window for specifying additional formal input parameters.

According to further embodiments of the invention, each of the GUI elements 502-504, 509 may further comprise selector-elements 505-507, 510 which allow the user to select one or more cells in a spreadsheet-document solely by means of graphical user interface. By using said selector elements, a user does not have to enter any row- or column indices which are hard to memorize and may be hidden by the dialog window.

Figure 6A:
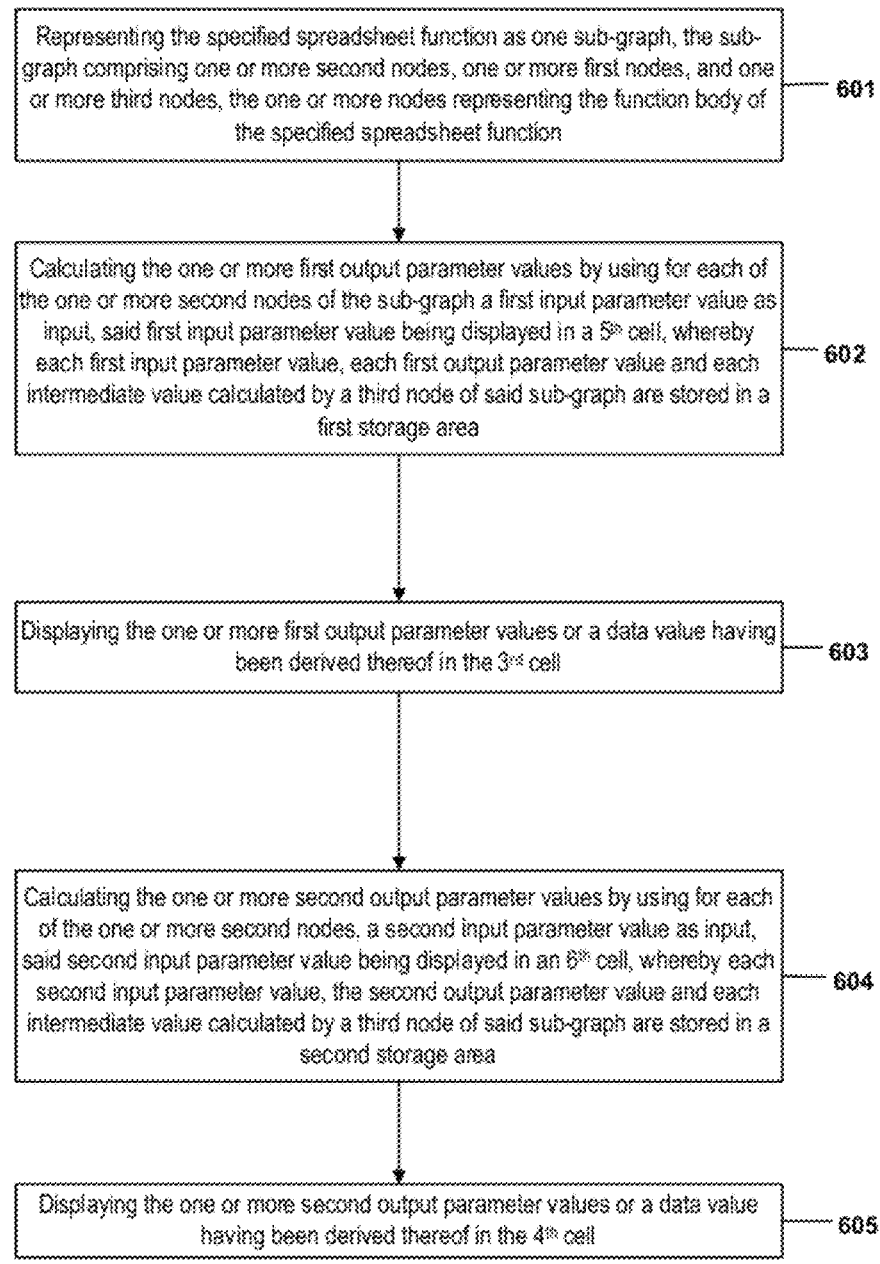
FIG. 6a depicts a flowchart of a sub-graph-based implementation of embodiments of the invention (implementation variant A1)

FIG. 6a is a flowchart of a method based on implementation variant A1—one single sub-graph per specified spreadsheet-function. Said single sub-graph comprises a set of connected nodes. Said set of connected nodes comprises a first node, one or more second nodes and one or more third nodes.

According to embodiments of the invention, the first node corresponds to the first cell representing the formal output parameter. Each of the second nodes corresponds to a second cell representing a formal input parameter. Each of the third nodes corresponds to a cell belonging to the first set of cells and specifying the function-body.

According to embodiments of the invention, each of the one or more third nodes comprises computer-implemented instructions for processing an input value received from a preceding second or third node, for generating an output value, and for returning said output value to a succeeding third node or a succeeding first node. The totality of the computer-implemented instructions contained in all the third nodes represents the function body of the spreadsheet-function.

Each second node of the sub-graph corresponds to a formal input parameter of the spreadsheet-function. 'Corresponds' implies that each second node receives its input data value as specified by the reference contained in the corresponding second cell. When the specified spreadsheet-function is executed, each second node is operable to receive an input parameter value. The first node of the sub-graph corresponds to the formal output parameter of the spreadsheet-function, wherein the term 'corresponds' implies that the result calculated by the first node of the sub-graph is assigned to the formal output parameter and is displayed in a cell assigned to the formal output parameter.

According to further embodiments of the invention, the sub-graph representing the specified spreadsheet-function is part of an executable, connected calculation sub-graph. According to said embodiments, displaying the first and second output parameter value in the $3^{rd}$ and the $4^{th}$ cell at the same time comprises the execution of steps 601-605.

In step 601, the specified spreadsheet-function is represented as one single sub-graph of the calculation graph of the spreadsheet document, e.g. by making use of the Singleton design pattern. Said sub-graph comprises one or more first, second and third nodes, respectively.

According to embodiments of the invention, each first node represents a formal output parameter and each second node represents a formal input parameter of the specified spreadsheet-function. According to embodiments of the invention, the totality of third nodes represents the function body of the specified spreadsheet-function and each third node corresponds to a cell belonging to the first set of cells.

In step 602, one or more first output parameter values are calculated. For each of the one or more second nodes of the sub-graph a first input parameter value is used as input. Said first input parameter value is displayed in a $5^{th}$ cell. Each first input parameter value, each first output parameter value and each intermediate data value calculated by a third node of said sub-graph are stored in a first storage area.

In step 603, the one or more first output parameter values or a data value having been derived thereof is displayed in the $3^{rd}$ cell.

In step 604 one or more second output parameter values are calculated by using, for each of the one or more second nodes, a second input parameter value as input. Said second input parameter being displayed in an $6^{th}$ cell, whereby each second input parameter value, each second output parameter value and each intermediate data value calculated by a third node of said sub-graph are stored in a second storage area.

In step 605 one or more second output parameter values or a data value having been derived thereof are displayed in the $4^{th}$ cell.

Figure 6B:
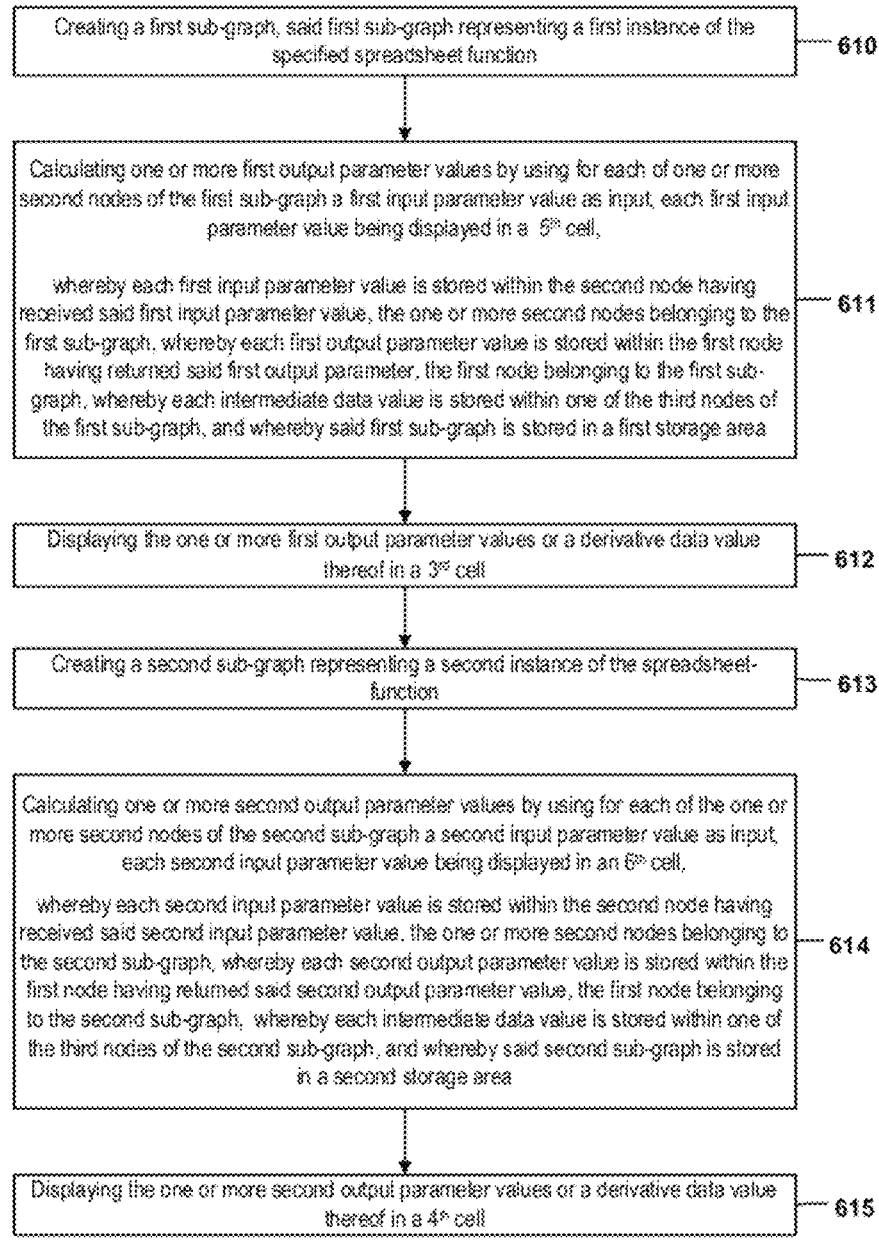
FIG. 6b depicts a flowchart of a sub-graph-based implementation of embodiments of the invention (implementation variant A2)

FIG. 6b is a flowchart of a method based on implementation variant A2—one sub-graph per specified spreadsheet-function instance.

In step 610 a first sub-graph is created, said sub-graph representing a first instance of the specified spreadsheet-function. Upon executing the specified spreadsheet-function on a set of input parameters, a new instance of the spreadsheet-function and corresponding sub-graph is created.

In step 611 one or more first output parameter values are calculated by using, for each of the one or more second nodes of the first sub-graph, a first input parameter value as input, each first input parameter value being displayed in a $5^{th}$ cell. Thereby, each first input parameter value is stored within the second node having received said first input parameter value, the one or more second nodes belonging to the first sub-graph. Each first output parameter value is stored within the first node having returned said first output parameter value, whereby the first node belongs to the first sub-graph. Each intermediate data value is stored within one of the third nodes of the first sub-graph, whereby said first sub-graph is stored in a first storage area.

In step 612, the one or more first output parameter values or a derivative data value thereof are displayed in the $3^{rd}$ cell.

In step 613, a second sub-graph is created. The second sub-graph represents a second instance of the spreadsheet-function being executed on a set of second input parameters.

In step 614, one or more second output parameter values are calculated by using, for each of the one or more second nodes of the second sub-graph, a second input parameter value as input, each second input parameter value being displayed in an $6^{th}$ cell. Each second input parameter value is stored within the second node having received said second input parameter value, the one or more second nodes belonging to the second sub-graph. Each second output parameter value is stored within the first node having returned said second output parameter value, the first node belonging to the second sub-graph. Each intermediate data value is stored within one of the third nodes of the second sub-graph, and whereby said second sub-graph is stored in a second storage area.

In step 615, the one or more second output parameter values or a derivative data value thereof is displayed in the $4^{th}$ cell.

Figure 7:
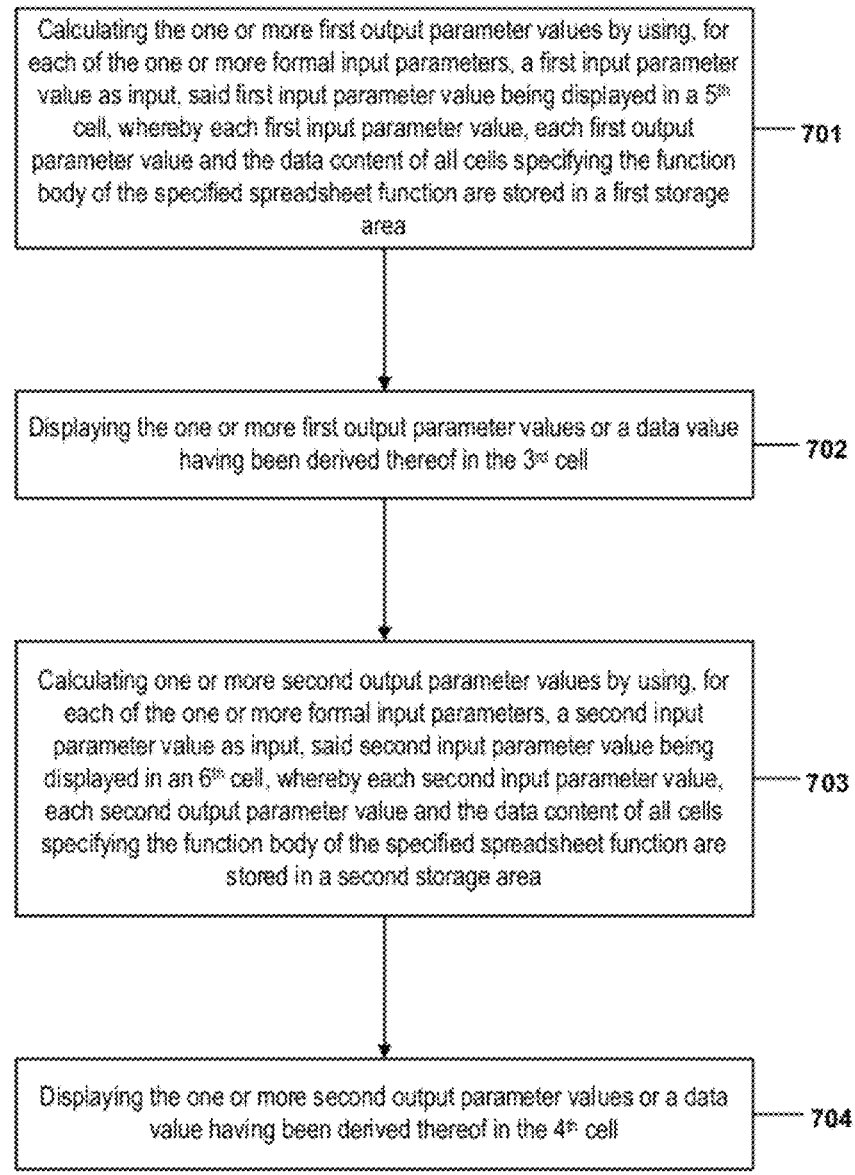
FIG. 7 depicts a flowchart of a non-sub-graph-based implementation of embodiments of the invention (implementation variant B)

FIG. 7 depicts a flowchart of the method according to further embodiments of the invention which are not graph-based (implementation variant B). Said embodiments store each input parameter value of a second cell, the output parameter value provided by each first cell and each data value and/or intermediate result provided by the cells of the first set of cells of a spreadsheet-function in a particular storage area. Each data value is stored in association with the cell a data value was derived from.

In step 701 the specified spreadsheet-function uses a first set of input parameters for calculating one or more first output parameter values. For each of the one or more formal input parameters, a first input parameter value is used as input, said first input parameter value being displayed in and having been obtained from a $5^{th}$ cell. Each first input parameter value, each first output parameter value and the data content of all cells specifying the function body of the specified spreadsheet-function are stored in a first storage area (FIG. 9, 826.3).

The one or more first output parameter values or a data value having been derived thereof are displayed in the $3^{rd}$ cell in step 702.

Figure 9:
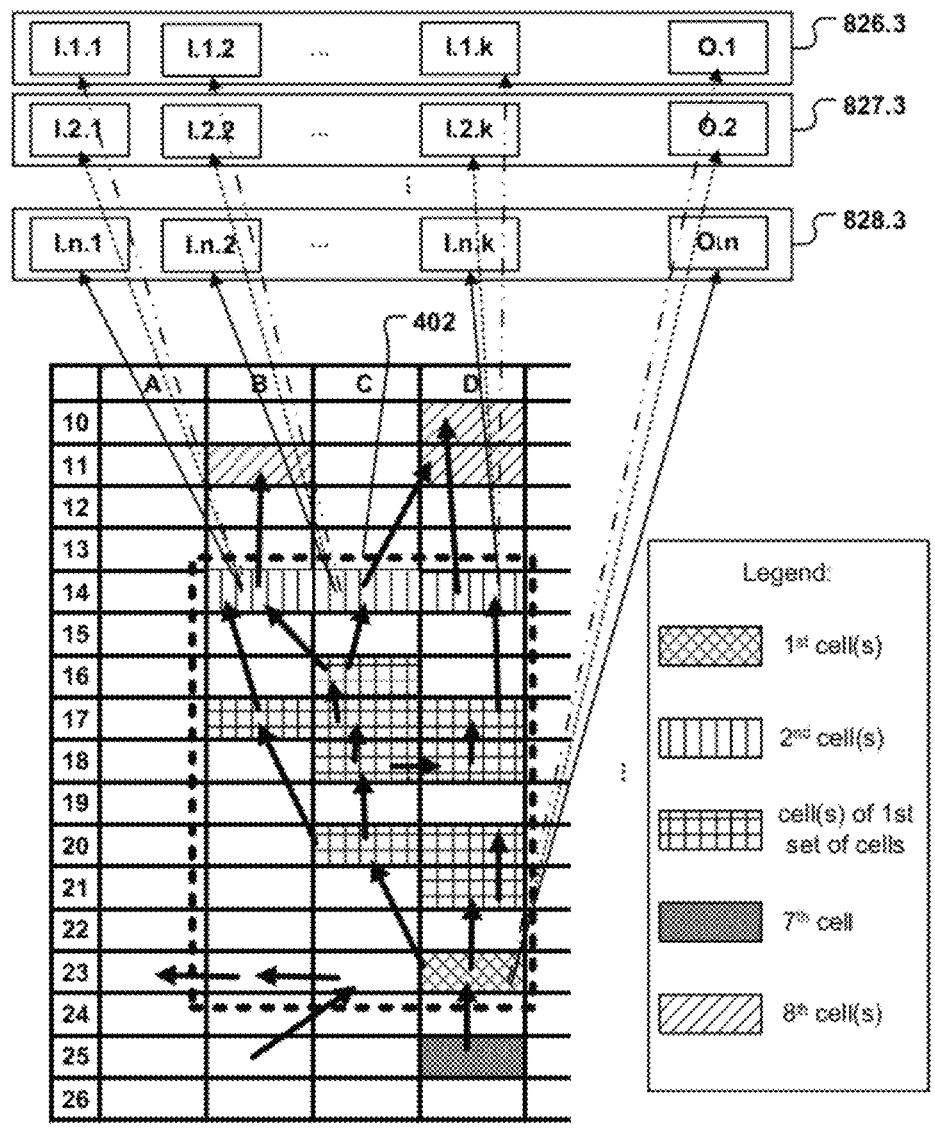
FIG. 9 depicts a non-graph based implementation of the specified spreadsheet-function (implementation variant B)

In step 703, one or more second output parameter values are calculated by using, for each of the one or more formal input parameters, a second input parameter value as input, said second input parameter value being displayed in an $6^{th}$ cell, whereby each second input parameter value, each second output parameter value and the data content of all cells specifying the function body of the specified spreadsheet-function are stored in a second storage area (FIG. 9, 827.3).

The one or more second output parameter values or a data value having been derived thereof are displayed in the $4^{th}$ cell in step 704.

The data content of each of said cells is stored in steps 701 and 703 in association with the cell it was derived from. The term 'in association' implies that the data content of each cell is stored in a way that a reference to the cell the data content was originally derived from it is also saved, allowing the reconstruction of the data content of said cell.

In case the specified spreadsheet-function is executed an nth time on an nth set of input parameter values, the corresponding input- and output parameter values are stored in an nth storage area (FIG. 9, 828.3).

Figure 8A:
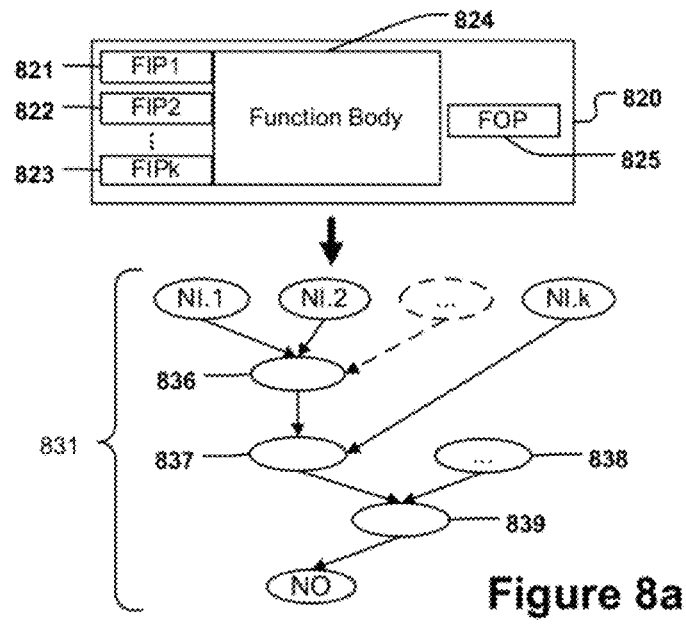
FIG. 8a depicts the representation of the specified spreadsheet-function as sub-graph

FIG. 8a depicts a representation of a specified spreadsheet-function 820 as a sub-graph 831 of a spreadsheet calculation graph (not shown) according to embodiments of the invention. The specified spreadsheet-function comprises formal input parameters 821, 822, 823, a function body 824 and a formal output parameter 825. Each formal input parameter corresponds to a second node NI.1, NI.2, . . . , NI.k. The formal output parameter corresponds to a first node NO. The computer-implemented instructions specifying the function body 824 of the spreadsheet-function are represented by the third nodes 836-839 depicted as white ellipses. The nodes of the sub-graph are connected.

According to embodiments of the invention, each node of the sub-graph corresponds to one cell of the spreadsheet documents: each second cell corresponds to a second node, each first cell corresponds to a first node and each cell of the first set of cells constituting the function body corresponds to a third node.

Figure 8B:
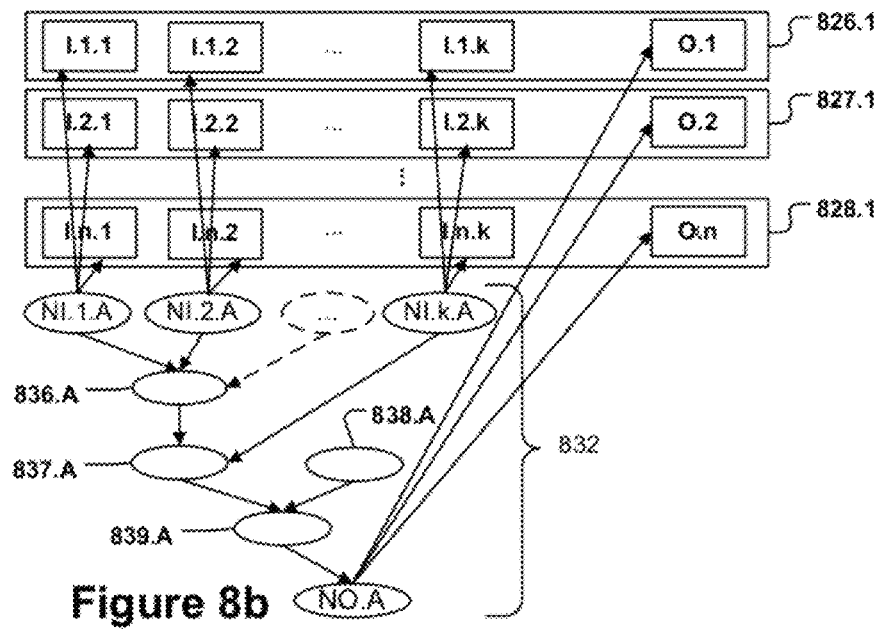
FIG. 8b depicts the representation of the specified spreadsheet-function as one single sub-graph (implementation variant A1)

FIG. 8b depicts embodiments of the invention according to which one single sub-graph 832 represents the specified spreadsheet-function. Each node of the sub-graph has assigned one or more data values. Each of the second nodes NI.1.A, NI.2.A, . . . , NI.k.A has assigned a first input parameter value I.1.1, I.1.2, . . . , I.1.k. The first node NO.A has assigned an output parameter value O.1, said output parameter value having been calculated on said set of first input parameter values I.1.1, I.1.2, . . . , I.1.k. The input parameter values I.1.1, I.1.2, . . . , I.1.k and the corresponding output parameter value O.1 are stored in a first storage area 826.1.

In case the specified spreadsheet-function is executed on a second and an nth set of input parameter values, for each set of input parameter values and corresponding output parameter value new assignments are created connecting a node of the sub-graph with a data value received or returned by said node.

For example, the first node NI.1.A is assigned to the input parameter value I.1.1 stored in the first storage area 826.2, said input parameter value belonging to a first set of input parameter values. In case the specified spreadsheet-function is executed in addition on a second set of input parameter values, first node NI.1.A is assigned to the input parameter value I.2.1 stored in the second storage area 827.2, said input parameter value belonging to a second set of input parameter values I.2.1, I.2.2, . . . , I.2.k. In case the specified spreadsheet-function is executed in addition on an nth set of input parameters I.n.1, I.n.2, . . . , I.n.k, first node NI.1.A is assigned to the input parameter value I.n.1 stored in the nth storage area 828.2. According to further embodiments of the invention (not shown), each third node is assigned to an intermediate data value calculated by said node for each set of input parameter values. Said intermediate data values are stored in association with their corresponding input and output parameter values.

Figure 8C:
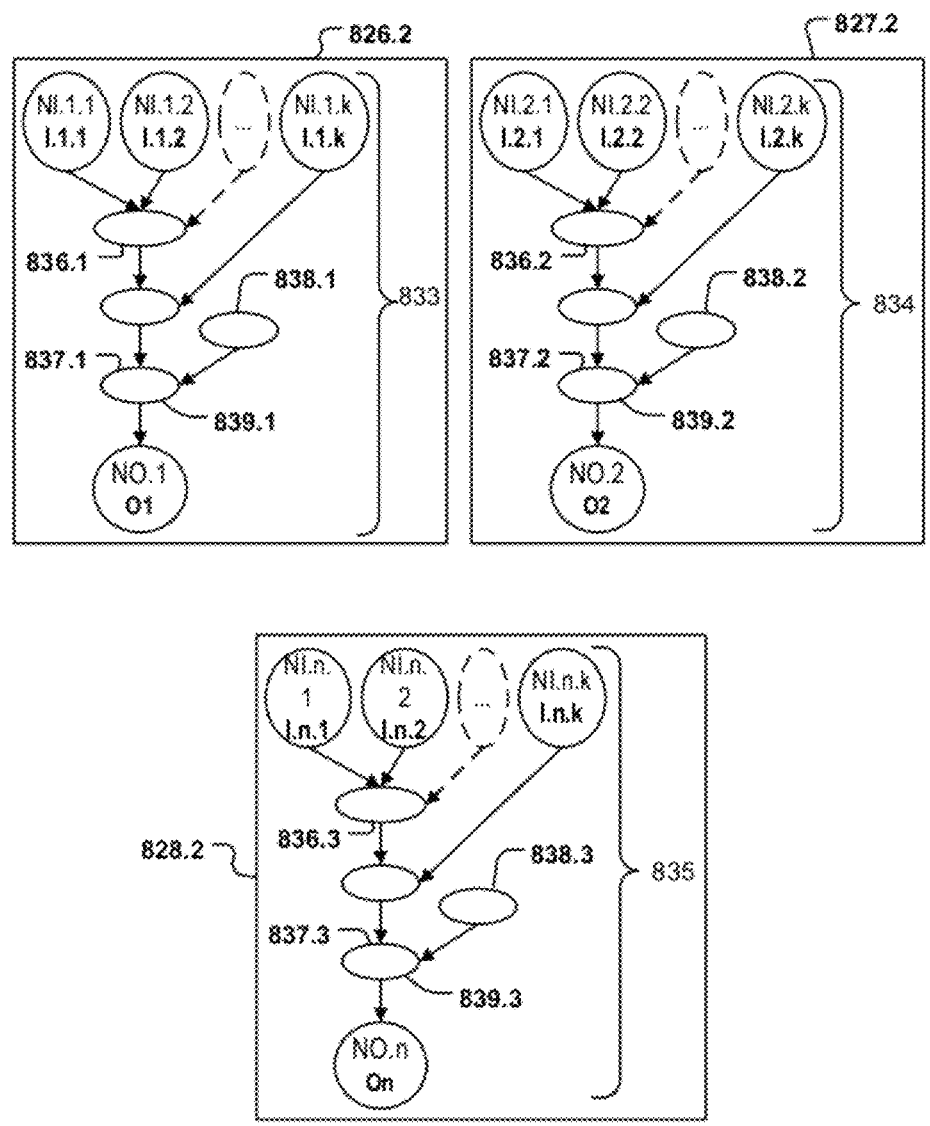
FIG. 8c depicts the representation of three instances of the specified spreadsheet-function by three sub-graphs (implementation variant A2)

FIG. 8c depicts embodiments of the invention according to which one sub-graph 833, 834, 835 is created upon each execution of the specified spreadsheet-function on a set of input parameter values. Accordingly, each sub-graph represents one instance of the specified spreadsheet-function. The arrows represent edges connecting the nodes of the graph and indicate the direction of data flow.

The first sub-graph 833 corresponds to the execution of the specified spreadsheet-function on a first set of input parameter values I.1.1, I.1.2, . . . , I.1.k. The second sub-graph 834 corresponds to the execution of the specified spreadsheet-function on a second set of input parameter values I.2.1, I.2.2, . . . , I.2.k. The nth sub-graph 835 corresponds to the execution of the specified spreadsheet-function on an nth set of input parameter values I.n.1, I.n.2, . . . , I.n.k. The first sub-graph, including its corresponding first input parameter values and its generated first output parameter value O1 is stored in a first storage area 826.2. The second sub-graph, including its corresponding second input parameter values and its generated second output parameter value O2 is stored in a second storage area 827.2. The nth sub-graph, including its corresponding nth input parameter values and its generated nth output parameter value O1 is stored in an nth storage area 828.2.

The data values received, processed or returned by a node are stored as part of said respective node.

By creating one sub-graph for each instance of the spreadsheet-function it is guaranteed that the data content of the cells stored within the node object instances is not overwritten by applying the specified spreadsheet-function on another set of input parameters a second time. As a result, multiple sets of input parameters can be used to calculate a multitude of corresponding output parameter values, the multitude of output parameter values being displayed in a spreadsheet document at the same time.

According to some embodiments of the invention, the storage areas 826.2, 827.2. and 828.2 are stack frames of a LIFO stack, thereby allowing the execution of nested functions, e.g. recursive functions.

FIG. 9 depicts an embodiment of a non-graph based implementation variant according to which each cell specifying the spreadsheet-function is assigned a data value for each set of input parameters.

Upon executing the specified spreadsheet-function on a first set of input parameters, each second cell 'cell I.1.1', 'cell I.1.2', . . . , 'cell I.1.k' specifying a formal input parameter FIP1, FIP2, . . . , FIPk is assigned a first input parameter value I.1.1, I.1.2, . . . , I.1.k. In addition, the first cell 'cell O.1' specifying a formal output parameter FOP is assigned a first output parameter value O.1 having been calculated on said first set of input parameters. The corresponding first input and output parameter values are stored in a first storage area 826.3.

Upon executing the specified spreadsheet-function on a second set of input parameters, each second cell 'cell I.2.1', 'cell I.2.2', . . . , 'cell I.2.k' specifying a formal input parameter FIP1, FIP2, . . . , FIPk is assigned a second input parameter value I.2.1, I.2.2, . . . , I.2.k. In addition, the first cell 'cell O.2' specifying the formal output parameter FOP is assigned a second output parameter value O.2 calculated on the second set of input parameters. The corresponding second input and output parameter values are stored in a second storage area 827.3.

According to further embodiments, each cell belonging to the first set of cells constituting the function body 824 is assigned an intermediate data value, said intermediate data value being used to calculate the first output parameter value. By storing the corresponding input-, output- and intermediate data values to separate data storage areas as depicted in FIG. 10 it is guaranteed that the results generated by executing the spreadsheet-function on a first set of input parameters is not overwritten by applying the specified spreadsheet-function on another set of input parameters a second time.

For clarity reasons, in FIGS. 8a, 8b, 8c and 9 only the input and output parameter values, not the corresponding intermediate data values are shown.

Figure 10:
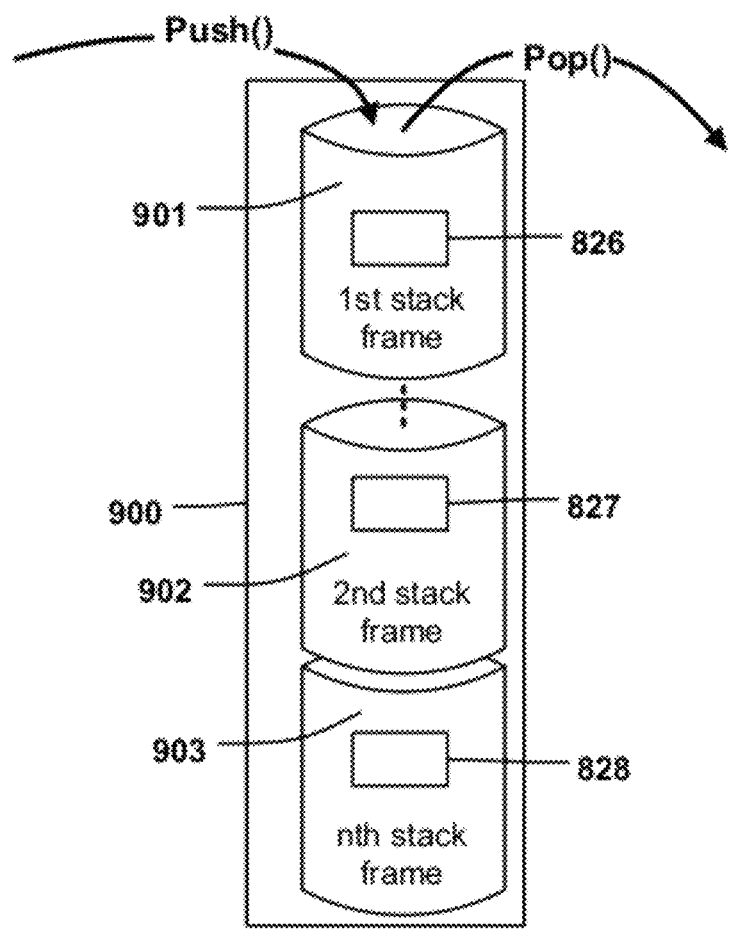
FIG. 10 depicts a LIFO stack comprising multiple stack frames.

FIG. 10 depicts a LIFO stack 900 allowing the execution of recursive spreadsheet-functions. The LIFO stack comprises multiple stack frames 901, 902, . . . , 903. Each stack frame comprises a storage area 826, 827, . . . , 828 according to any of the implementation variants A1, A2 or B. The data values and instructions having been added most recently on the stack in a push( ) operation are the first to be processed in a pop( ) operation. The result returned by the data values and instructions comprised in the first storage area 826 contained in the first stack frame 826 can be processed by the instructions of the second storage area 827 contained in the second stack frame 902.

Figure 11:
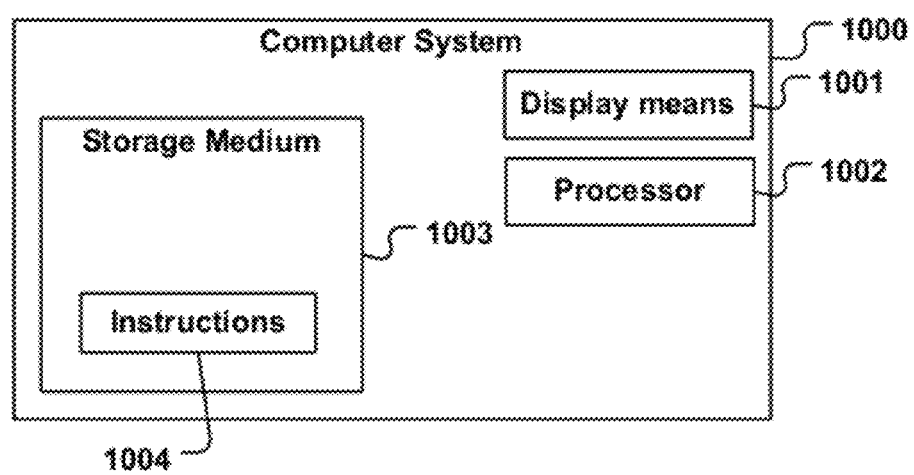
FIG. 11 depicts a computer system.

FIG. 11 depicts a computer system 1000 which can be, for example, a desktop computer, a notebook, a mobile phone, or any other processing device running a spreadsheet application. The computer system comprises display means 1001, e.g. a screen, a monitor, a touch screen or the like. Said display means display the worksheet of the spreadsheet application to the user. The storage medium 1003 comprises computer interpretable instructions 1004. Said instructions can be executed by the processor 1002. The storage medium 1003 can be any non-transitory storage medium such as CD-ROMs, magneto-optical storage devices, Flash storage devices and the like. When the processor 1002 executes the instructions 1004, the processor is caused to perform a method for displaying data values calculated by a spreadsheet-function according to any of the embodiments of the invention described beforehand. As a result, a user is able to specify a re-usable spreadsheet-function without applying any programming skills, to apply said specified spreadsheet-function on more than one set of input parameter values and to view multiple calculated result values on the display means 1001 at the same time.

LIST OF REFERENCES

101-109 steps
201-208 steps
301-304 steps
400 worksheet of a spreadsheet document
401 cell
402 dotted square indicating second set of cells
403-420 references
440 $7^{th}$ cell
441 first cell
442-450 cells belonging to a first set of cells
451 second cell
452 second cell
453 $8^{th}$ cell
454 empty cell not belonging to the second set of cells
455 empty cell belonging to the second set of cells
457-459 cells usable for specifying a second spreadsheet-function
460 $5^{th}$ cell
461 $5^{th}$ cell
462 $3^{rd}$ cell
463 $8^{th}$ cell
464 $6^{th}$ cell
465 $6^{th}$ cell
466 $4^{th}$ cell
470 GUI element
500 dialog window
501-504 GUI element
505-507 selector elements
508 GUI element for adding additional formal input parameters
509 GUI element
510 selector element
511 formula
601-615 steps
701-704 steps
820 specified spreadsheet-function
821 formal input parameter 1
822 formal input parameter 2
823 formal input parameter 3
824 function body
825 formal output parameter
826 storage area
827 storage area
828 storage area
831 sub-graph
832 sub-graph
833 sub-graph
834 sub-graph
835 sub-graph
836-839 third nodes
NI.1-NI.k second nodes
NO first node
I.1.1-I.1.$k$ first input parameter values
I.2.1-I.2.$k$ second input parameter values
I.n.1-I.1.$k$ nth input parameter values
cell I.1.1-cell I.n.k cells comprising input parameter value
cell O.1-cell O.n cells displaying output parameter value
900 LIFO stack
901 first stack frame
902 second stack frame
903 nth stack frame
1000 computer system
1001 display means
1002 processor
1003 storage medium
1004 computer-implemented instructions

The invention claimed is:

1. A computer-implemented method for automatically defining a reusable spreadsheet-function and for displaying data values calculated by the reusable spreadsheet-function, wherein the computer includes an input/output, a processor, a memory and a display; wherein a first cell of a spreadsheet document is specified for an output parameter value to be calculated as a result of a spreadsheet-function; wherein a second cell of the spreadsheet document is specified for an input parameter value to be used for calculating said result by the spreadsheet-function; wherein a spreadsheet-function body is specified by cells of a spreadsheet document; with one or more formal output parameters, one or more formal input parameters and the specified spreadsheet-function body specifying a spreadsheet-function; the method comprising the steps of:
   a. modifying the computer implementation to establish a distinct storage area composed of a plurality of storage elements each selected from the group consisting of a linked list, an entry of a hash-map, an element of a queue, a frame of a stack, a frame of a LIFO stack and mixtures thereof;
   b. modifying the computer implementation to cause the computer to automatically extract the reusable spreadsheet function from a complex calculation specified by a set of connected cells in a spreadsheet document by finding references pointing to or from cells belonging to said set of cells specifying the complex calculation, the extraction comprising:
      i. receiving a selection of a set of cells from a user selected by a mouse;
      ii. providing a GUI element, the GUI element being configured, upon an interaction of the user with said GUI element, to trigger the automated specification of the spreadsheet-function based on the selected set of cells, the automated specification comprising:
         1) determining all cells belonging to said selected set of cells which are referenced by a cell not belonging to the selected set of cells;

2) using one of said determined cells as a formal output parameter of the spreadsheet-function to be specified;
3) using said one formal output parameter cell as starting point for specifying the function-body of said spreadsheet-function to be automatically specified:
4) by following all references starting from said one formal output cell, whereby the function-body of the spreadsheet-function to be specified is constituted by all cells being referenced by said one formal output parameter cell via one reference and/or via one or more chains of references and which do not comprise a reference to a cell not belonging to the selected set of cells; and
5) using the formulas and/or data values and/or references contained in the cells belonging to the selected set of cells to specify the function-body of the spreadsheet-function;
6) using said one formal output parameter cell as starting point for specifying one or more formal input parameters of said spreadsheet-function to be automatically specified by determining all cells within the selected set of cells which each:
are referenced by the formal output parameter cell via one reference and/or via at least one chain of references; and
which each comprise a reference to a cell not belonging to the selected set of cells;
using each of the one or more found selected cells to specify one formal input parameter of the spreadsheet-function to be specified; and
c. storing the specified spreadsheet function, formal output parameter and formal input parameter in a distinct storage element of a distinct storage area and maintaining without over-writing, whereby it is callable and reusable.

2. The computer-implemented method according to claim 1, comprising the further steps of: modifying the computer implementation to establish a LIFO frame stack to serve as the distinct storage area and each frame as an element thereof; storing the automatically generated spreadsheet-function in a frame of the LIFO stack; storing input values, intermediate values and final results of a recursive execution of the automatically generated spreadsheet-function in each of a plurality of distinct stack frames corresponding to each distinct recursion level.

3. The computer-implemented method according to claim 1, wherein the specification of the spreadsheet-function includes the step of transforming the specified formal output parameter, the one or more formal input parameters and the specified method body into a formal method of a programming language.

4. The computer-implemented method according to claim 1, includes the further steps of displaying one or more first output parameter values or a data value having been derived thereof in a view mode and displaying a spreadsheet-function formula representing the spreadsheet-function in edit mode.

5. The computer-implemented method according to claim 1, wherein the one or more formal input parameters and the one or more formal output parameters are specified by the user via a dialog window of a graphical user interface.

6. The computer-implemented method according to claim 1, including the further step of creating a new instance of the specified spreadsheet-function upon each execution of the specified spreadsheet-function and wherein each instance of the specified spreadsheet-function is represented as sub-graph, each sub-graph comprising:
one or more first nodes, each first node representing a formal output parameter of the specified spreadsheet-function, each first node returning an output parameter value when the spreadsheet-function is executed;
one or more second nodes, each second node representing a formal input parameter of the specified spreadsheet-function, each second node receiving an input parameter value when the spreadsheet-function is executed; and
one or more third nodes representing the function body of the specified spreadsheet-function.

7. The computer-implemented method according to claim 6, includes the further step of displaying first and second output parameter values or a data value having been derived thereof obtained in separate instances of the specified spreadsheet-function in separate cells of a spreadsheet document at the same time comprises the steps of:
Creating a first sub-graph, said first sub-graph representing a first instance of the specified spreadsheet-function;
Calculating one or more first output parameter values by using, for each of the one or more second nodes of the first sub-graph, a first input parameter value as input, said first input parameter value being displayed in a separate cell of a spreadsheet document;
whereby each first input parameter value is stored within the second node having received said first input parameter value; the one or more second nodes belonging to the first sub-graph,
whereby each first output parameter value is stored within the first node having returned said first output parameter value, the one or more first nodes belonging to the first sub-graph;
whereby each intermediate data value is stored within one of the third nodes of the first sub-graph; and
whereby said first sub-graph is stored in a first storage area;
Displaying the one or more first output parameter values or a data value having been derived thereof in a first separate cell;
Creating a second sub-graph representing a second instance of the spreadsheet-function;
Calculating one or more second output parameter values by using, for each of the one or more second nodes of the second sub-graph, a second input parameter value as input, said second input parameter value being displayed in a second separate cell;
whereby each second input parameter value is stored within the second node having received said second input parameter value, the one or more second nodes belonging to the second sub-graph;
whereby each second output parameter value is stored within the first node having returned said second output parameter value, the first node belonging to the second sub-graph;
whereby each intermediate data value is stored within one of the third nodes of the second sub-graph; and
whereby said second sub-graph is stored in a second storage area;
Displaying the one or more second output parameter values or a data value having been derived thereof in the second cell; and
Maintaining the first and second storage areas mutually distinct without overwriting.

8. The computer-implemented method according to claim 7, including the further step of creating a succession of sub-graphs representing a succession of instances of the spreadsheet-function; and storing each created sub-graph in a distinctive storage area without over-writing.

9. The computer-implemented method according to claim 1, comprising the further step of modifying the computer implementation to establish a LIFO frame stack to serve as distinct memory for storing input values, intermediate values and final results of a recursive execution of an automatically generated spreadsheet-function, wherein each of a plurality of distinct stack frames corresponds to a distinct recursion level.

10. A computer-readable, non-transitory storage medium having stored instructions that when executed by a processor cause the processor to perform a method comprising the steps of:
   a. automatically defining a reusable spreadsheet-function and displaying data values calculated by the reusable spreadsheet-function, wherein the computer includes an input/output, a processor, a memory and a display; wherein a first cell of a spreadsheet document is specified for an output parameter value to be calculated as a result of a spreadsheet-function; wherein a second cell of the spreadsheet document is specified for an input parameter value to be used for calculating said result by the spreadsheet-function; wherein a spreadsheet-function body is specified by cells of a spreadsheet document with one or more formal output parameters, one or more formal input parameters and a spreadsheet-function;
   b. modifying the computer implementation to establish a distinct storage area composed of a plurality of storage elements each selected from the group consisting of a linked list, an entry of a hash-map, an element of a queue, a frame of a stack, a frame of a LIFO stack and mixtures thereof;
   c. modifying the computer implementation to cause the computer to automatically extract the reusable spreadsheet function from a complex calculation specified by a set of connected cells in a spreadsheet document by finding references pointing to or from cells belonging to said set of cells specifying the complex calculation, the extraction comprising:
      i. receiving a selection of a set of cells from a user selected by a mouse;
      ii. providing a GUI element, the GUI element being configured, upon an interaction of the user with said GUI element, to trigger the automated specification of the spreadsheet-function based on the selected set of cells, the automated specification comprising:
         1) determining all cells belonging to said selected set of cells which are referenced by a cell not belonging to the selected set of cells;
         2) using one of said determined cells as a formal output parameter of the spreadsheet-function to be specified;
         3) using said one formal output parameter cell as starting point for specifying the function-body of said spreadsheet-function to be automatically specified;
         4) by following all references starting from said one formal output cell, whereby the function-body of the spreadsheet-function to be specified is constituted by all cells being referenced by said one formal output parameter cell via one reference and/or via one or more chains of references and which do not comprise a reference to a cell not belonging to the selected set of cells; and
         5) using the formulas and/or data values and/or references contained in the cells belonging to the selected set of cells to specify the function-body of the spreadsheet-function;
         6) using said one formal output parameter cell as starting point for specifying one or more formal input parameters of said spreadsheet-function to be automatically specified by determining all cells within the selected set of cells which each:
            are referenced by the formal output parameter cell via one reference and/or via at least one chain of references; and
            which each comprise a reference to a cell not belonging to the selected set of cells;
            using each of the one or more found selected cells to specify one formal input parameter of the spreadsheet-function to be specified; and
   d. storing the specified spreadsheet function, formal output parameter and formal input parameter in a distinct storage element of a distinct storage area and maintaining without over-writing, whereby it is callable and reusable.

11. A computer-implemented method for automatically defining a reusable spreadsheet-function, the computer including an input/output, a processor, a memory and a display, the method comprising the steps of:
   a. modifying the computer implementation to establish a distinct storage area composed of a plurality of storage elements each selected from the group consisting of a linked list, an entry of a hash-map, an element of a queue, a frame of a stack, a frame of a LIFO stack and mixtures thereof;
   b. specifying one or more formal input parameters by specifying, for each formal input parameter, a first pre-selected cell of a spreadsheet document, whereby each formal input parameter is a placeholder to which an input parameter value to be used for calculating said result by said spreadsheet-function to be specified is assignable;
   c. extracting automatically via the computer a reusable spreadsheet-function from a complex calculation specified by a predetermined set of connected cells in a spreadsheet document of a spreadsheet application by finding references pointing to or from cells belonging to said set of cells specifying the complex calculation;
   d. wherein the automatic extraction comprises:
      i. selecting a predetermined set of connected cells;
      ii. determining all cells belonging to said predetermined set of cells which are referenced by a cell not belonging to the predetermined set of cells;
      iii. using one of said determined cells as a formal output parameter of the spreadsheet-function to be specified;
      iv. using said one formal output parameter cell as starting point for specifying the function-body of said spreadsheet-function to be automatically specified by following all references starting from said one formal output cell, whereby the function-body of the spreadsheet-function to be specified is constituted by all cells of said predetermined set being referenced by said one formal output parameter cell via one reference and/or via one or more chains of references and which do not comprise a reference to a cell not belonging to the predetermined set of cells; and using the formulas and/or data values and/or references contained in the cells belonging to the predetermined set of cells to specify the function-body of the spreadsheet-function;
   e. storing in a storage element of the distinct storage area the determined spreadsheet-function body including one or more formal input parameters, the formal output parameter and the reusable spreadsheet-function;
f. triggering by a user the automated specification of the extracted reusable spreadsheet-function based on the predetermined set of cells with respect to one or more input parameter value for calculating first one or more output parameter values or data values having been derived thereof for each of the one or more formal output parameters by said spreadsheet-function;
g. displaying the one or more first output parameter values or data value having been derived thereof in a first cell of a spreadsheet document being displayed;
h. calculating second one or more output parameter values for each of the one or more formal output parameters by using one or more second input parameter values as input of the spreadsheet-function;
i. storing the second one or more output parameter values for each of the one or more formal output parameters in a separate element of the distinct storage area; and
j. displaying the one or more second output parameter values or a data value having been derived thereof in a second cell, wherein the first and second cells display at the same time their respective one or more output parameter values or data values having been derived thereof within the spreadsheet document.

* * * * *